(12) United States Patent
Nishi et al.

(10) Patent No.: US 9,561,789 B2
(45) Date of Patent: Feb. 7, 2017

(54) HYBRID WORK VEHICLE

(75) Inventors: Keishiro Nishi, Sakai (JP); Hidetoshi Hana, Sakai (JP); Atsushi Shinkai, Tondabayashi (JP); Hisao Mukai, Sakai (JP); Michita Kono, Sakai (JP); Yushi Matsuzaki, Sakai (JP); Yoshitomo Fujimoto, Izumi (JP); Susumu Umemoto, Nara (JP); Shigeki Hayashi, Sakai (JP); Norio Obata, Itami (JP); Toshikazu Kawamoto, Osaka (JP); Nobushige Ichikawa, Izumi (JP)

(73) Assignee: Kubota Corporation, Osaka (JP)

( * ) Notice: Subject to any disclaimer, the term of this patent is extended or adjusted under 35 U.S.C. 154(b) by 29 days.

(21) Appl. No.: 14/000,430

(22) PCT Filed: Aug. 27, 2012

(86) PCT No.: PCT/JP2012/071587
§ 371 (c)(1),
(2), (4) Date: Jan. 22, 2014

(87) PCT Pub. No.: WO2013/145362
PCT Pub. Date: Oct. 3, 2013

(65) Prior Publication Data
US 2014/0148984 A1    May 29, 2014

(30) Foreign Application Priority Data

Mar. 28, 2012 (JP) .................................. 2012-074376
Mar. 28, 2012 (JP) .................................. 2012-074377
Mar. 29, 2012 (JP) .................................. 2012-078122

(51) Int. Cl.
*B60W 20/00* (2016.01)
*B60W 10/08* (2006.01)
(Continued)

(52) U.S. Cl.
CPC .............. *B60W 20/10* (2013.01); *B60K 6/485* (2013.01); *B60W 10/02* (2013.01); *B60W 10/06* (2013.01);
(Continued)

(58) Field of Classification Search
CPC ........... A01B 63/00; B60K 1/02; B60W 20/00
(Continued)

(56) References Cited

U.S. PATENT DOCUMENTS 5,823,280 A * 10/1998 Lateur ..................... B60K 1/02
180/165
6,408,823 B1 * 6/2002 Takahashi ........... F02D 41/2464
123/456
(Continued)

FOREIGN PATENT DOCUMENTS

CN         102267366 A     12/2011
EP          1255031 A2     11/2002
(Continued)

*Primary Examiner* — Thomas G Black
*Assistant Examiner* — Wae Louie
(74) *Attorney, Agent, or Firm* — The Webb Law Firm

(57) ABSTRACT

A hybrid work vehicle is provided with an internal combustion engine for supplying driving force to a running device and a work implement via a transmission shaft, a motor generator for assisting the internal combustion engine by outputting power to the transmission shaft, and a battery for receiving charging electricity from the motor generator and giving driving electricity to the motor generator. A load information generation unit generates load information indicating a rotational load received by the internal combustion engine when in a constant-speed control mode for maintaining a constant number of revolutions of the internal combustion engine, based on an input parameter, and an assistance calculation unit calculates an amount of assistance for internal combustion engine by the motor generator, based on
(Continued)

the load information when in the constant-speed control mode.

18 Claims, 16 Drawing Sheets

(51) Int. Cl.
 *B60W 10/06* (2006.01)
 *B60K 6/485* (2007.10)
 *B60W 10/02* (2006.01)
(52) U.S. Cl.
 CPC .............. *B60W 10/08* (2013.01); *B60W 20/19* (2016.01); *B60W 2300/152* (2013.01); *B60W 2510/0657* (2013.01); *B60W 2710/0644* (2013.01); *B60W 2710/083* (2013.01); *B60Y 2200/411* (2013.01); *Y02T 10/6226* (2013.01); *Y10S 903/93* (2013.01)
(58) Field of Classification Search
 USPC ................... 701/22, 50; 180/65.235, 65.245
 See application file for complete search history.

(56) References Cited

U.S. PATENT DOCUMENTS

| | | | | |
|---|---|---|---|---|
| 6,745,117 | B1* | 6/2004 | Thacher | A01B 63/00 180/65.8 |
| 8,474,560 | B1* | 7/2013 | Konz | B60R 16/04 180/68.5 |
| 8,649,927 | B2* | 2/2014 | Gustavsson | B66C 3/04 123/319 |
| 8,672,069 | B2* | 3/2014 | Cherney | B60K 6/46 180/24.07 |
| 9,038,759 | B2* | 5/2015 | Kaneko | B60K 6/46 180/14.2 |
| 2003/0205422 | A1* | 11/2003 | Morrow | B60K 6/365 180/65.23 |
| 2004/0222000 | A1 | 11/2004 | Ohtsukasa | |
| 2008/0223631 | A1* | 9/2008 | Filla | B60K 6/387 180/65.1 |
| 2009/0095549 | A1* | 4/2009 | Dalum | B60K 6/12 180/65.265 |
| 2010/0048338 | A1* | 2/2010 | Si | B60K 6/365 475/5 |
| 2010/0268407 | A1* | 10/2010 | Yanagisawa | B60K 6/46 701/22 |
| 2010/0314181 | A1* | 12/2010 | Beeson | B23K 9/1006 180/53.5 |
| 2010/0332061 | A1* | 12/2010 | Forslow | E02F 9/2091 701/22 |
| 2011/0048827 | A1* | 3/2011 | Cherney | B60K 6/46 180/65.245 |
| 2012/0059537 | A1* | 3/2012 | Hendrickson | H02M 7/44 701/22 |
| 2013/0066496 | A1* | 3/2013 | Ishii | B60K 6/485 701/22 |
| 2013/0149093 | A1* | 6/2013 | Kaneko | E02F 9/0858 414/685 |
| 2013/0151055 | A1* | 6/2013 | Kaneko | B60W 10/26 701/22 |
| 2014/0053683 | A1* | 2/2014 | West | F16H 37/065 74/661 |
| 2014/0148984 | A1* | 5/2014 | Nishi | B60K 6/485 701/22 |
| 2014/0163804 | A1* | 6/2014 | Kaneko | B60K 6/46 701/22 |
| 2014/0332294 | A1* | 11/2014 | Soma' | B60K 6/26 180/65.245 |
| 2015/0006010 | A1* | 1/2015 | Ito | E02F 9/2075 701/22 |

FOREIGN PATENT DOCUMENTS

| | | |
|---|---|---|
| JP | 4325736 A | 11/1992 |
| JP | 6107215 A | 4/1994 |
| JP | 6213051 A | 8/1994 |
| JP | 7174218 A | 7/1995 |
| JP | 974602 A | 3/1997 |
| JP | 1182104 A | 3/1999 |
| JP | 2002252904 A | 9/2002 |
| JP | 2002326526 A | 11/2002 |
| JP | 2004100621 A | 4/2004 |
| JP | 2004194414 A | 7/2004 |
| JP | 200582138 A | 3/2005 |
| JP | 2005207386 A | 8/2005 |
| JP | 2005341644 A | 12/2005 |
| JP | 2006151335 A | 6/2006 |
| JP | 2007290607 A | 11/2007 |
| JP | 2009220643 A | 10/2009 |
| JP | 2011196518 A | 10/2011 |

* cited by examiner

HYBRID WORK VEHICLE

CROSS-REFERENCE TO RELATED APPLICATIONS

This application is the United States national phase of International Application No. PCT/JP2012/071587 filed, Aug. 27, 2012, and claims priority to Japanese Patent Application Nos. 2012-074376 and 2012-074377, both filed Mar. 28, 2012 and 2012-078122 filed Mar. 29, 2012, the disclosures of which are hereby incorporated in their entirety by reference.

TECHNICAL FIELD

The present invention relates to a hybrid work vehicle including an internal combustion engine and a battery charged by the internal combustion engine, more particularly to a hybrid work vehicle including a power source using an internal combustion engine and a motor generator, the internal combustion engine being assisted by the motor generator.

BACKGROUND ART

With a hybrid work vehicle in which a motor generator assists an internal combustion engine, the vehicle is caused to run with power supplied from the internal combustion engine, and the motor generator is operated as a motor in accordance with running conditions (vehicle speed, amount of operation of an accelerator pedal (accelerator opening), operation state of internal combustion engine, state of running road surface, gear position, remaining battery capacity, etc.), and the running of the vehicle is assisted with power that is output from the motor generator. Also, this motor generator can be operated as a generator, and can supply electricity to a battery to charge it. The vehicle is configured such that, when the motor generator is operated as a motor, torque (assistance torque) that should be borne by the motor generator can be generated in accordance with a ratio between vehicle drive torque to be borne by the internal combustion engine and vehicle drive torque to be borne by the motor generator with respect to the vehicle drive torque required by a driver (target vehicle drive torque, which is obtained based on an accelerator pedal operation by a driver etc., for example) (this load ratio is specified based on running conditions etc.), by controlling torque generated by the motor generator.

For example, with a hybrid power unit disclosed in Patent Literature 1 (JP 2002-252904 A), two control maps with different assistance patterns (relationships between the number of engine revolutions and torque) for an internal combustion engine by a motor generator are prepared, and the control maps are switched to perform assistance control in accordance with state information such as the state of battery charging capacity (SOC), the vehicle speed, the state of a transmission, and the internal combustion engine temperature. Thus, excellent driving performance is maintained while using a small-horsepower internal combustion engine.

Also, with a hybrid power unit disclosed in Patent Literature 2 (JP H4-325736 A) including an electric motor for providing torque assistance to an internal combustion engine when starting or accelerating a vehicle, a battery charging state is detected, an auxiliary torque amount (assistance amount) that can be supplied from the electric motor to the internal combustion engine is calculated based on the detected charging state, and the amount of fuel supplied to the internal combustion engine and the ratio to be borne by the electric motor are varied based on the auxiliary torque amount. Thus, electricity supply to the electric motor is stopped when the charging percentage is small, thereby preventing the battery from going flat.

Vehicles that employ a hydraulic operation mechanism for a transmission as a hydraulic vehicle operation device include a vehicle in which a transmission hydraulic pump provided in the transmission is driven by a running-drive electric motor, and a desired transmission gear ratio is achieved by controlling, with a controller, transmission hydraulic pressure supplied from this transmission hydraulic pump. With such a transmission with a transmission hydraulic pump driven by an electric motor, in order to avoid incapability to smoothly shift gears due to a delay in the rise of transmission hydraulic pressure, the transmission hydraulic pressure is always supplied to the transmission by constantly rotating the electric motor. However, the constant rotation of the electric motor is uneconomical due to needless battery consumption. To solve this problem, with a hydraulic transmission control device disclosed in Patent Literature 3 (JP H07-174218 A), an electric motor for driving a transmission hydraulic pump is stopped in a state where a shift lever is set to a parking range or a neutral range, a hand brake is pulled, and an accelerator pedal is not stepped, and meanwhile, the electric motor is actuated in a state where the shift lever is set to the parking range or the neutral range, when at least the hand brake is released or the accelerator pedal is stepped. In other words, the timing of control for turning on/off an electric-hydraulic pump is determined in accordance with the state of vehicle operation, thereby suppressing needless rotation of the electric-hydraulic pump, that is, an electric motor for driving a pump, and suppressing battery consumption. Although the battery consumption is suppressed by controlling the turning on/off of the electric-hydraulic pump when hydraulic pressure is necessary in this hydraulic vehicle operation device, control for optimizing the amount of hydraulic pressure by adjusting the number of rotations of the hydraulic pump is not taken into account.

Also, Patent Literature 4 (JP H06-107215 A) recites a vehicle in which a vehicle electric-hydraulic power-steering device using an electric-hydraulic pump is mounted as a hydraulic vehicle operation device. With this vehicle electric-hydraulic power-steering device, when a steering wheel is operated, a driving wheel is steered through a steering mechanism in accordance with the steering wheel operation. At this time, the electric-hydraulic pump operates with an electric motor, which serves as a driving source, to drive hydraulic fluid, the hydraulic fluid is supplied to a piston mechanism through a hydraulic circuit, and the steering in the steering mechanism is assisted by the piston mechanism. The operation of the electric-hydraulic pump is controlled by a pump control means based on a detection signal from a steering angle detection means, and particularly, if it is determined by a straight running determination means that the vehicle is in a straight running mode in a case where the steering angle detected by the steering angle detection means is smaller than or equal to a predetermined amount and a frequency of change in a steering state is higher than or equal to a predetermined frequency, the operation of the electric-hydraulic pump is stopped by a pump stop means provided in the pump control means. Battery consumption is suppressed by stopping the electric-hydraulic pump in a case of straight running and a certain steering angle. However, particularly with work vehicles operated at a larger steering angle, such as a tractor, the necessary amount of hydraulic pressure that should be supplied to a hydraulic circuit varies in various steering processes, and it therefore is insufficient to simply perform control for turning on/off the electric-hydraulic pump under the only conditions of straight running and curve driving.

PRIOR ART LIST

Patent Literature

[Patent Literature 1] JP 2002-252904 A (paragraphs [0001]-[0026], FIG. 1, FIG. 2)
[Patent Literature 2] JP H4-325736 A (paragraphs [0006]-[0021], FIG. 1, FIG. 2)
[Patent Literature 3] JP H07-174218 A
[Patent Literature 4] JP H06-107215 A

SUMMARY OF INVENTION

Problem(s) to be Solved by the Invention

In a hybrid work vehicle including an internal combustion engine for supplying driving force to a running device and a work implement via a transmission shaft and a motor generator for assisting the internal combustion engine by outputting power to the transmission shaft, a large work load received by the work implement is propagated to the transmission shaft, and accordingly, the technique for assisting a hybrid work vehicle that is not equipped with a work implement, such as one described in Patent Literature 1, cannot be utilized. In particular, constant-speed control for maintaining a constant number of engine revolutions is essential in a work vehicle such as a tractor for cultivating the land, and it is difficult to apply the motor assistance technology used in a hybrid work vehicle to motor assistance in such constant-speed control.

Since the hybrid vehicles described in Patent Literature 1 and Patent Literature 2 are passenger cars, and the necessity of torque assistance for an internal combustion engine can be determined based only on the amount of stepping on an accelerator pedal operated by a driver, the torque assistance process is controlled accordingly in Patent Literature 1 and Patent Literature 2. In contrast, in a hybrid work vehicle such as a tractor, which includes an internal combustion engine for supplying driving force to a running device and a work implement via a transmission shaft and a motor generator for assisting the internal combustion engine by outputting power to the transmission shaft, a large work load received by the work implement is propagated to the transmission shaft. Accordingly, the assistance technology disclosed in Patent Literature 1 and Patent Literature 2 cannot be utilized as is.

An object of the present invention is to provide a hybrid work vehicle for enabling running for working with an appropriate work implement, using a small-output internal combustion engine, while preventing a battery from going flat.

In particular, in constant-speed control for keeping a constant number of revolutions of the internal combustion engine, it is important that the internal combustion engine is effectively assisted by a motor generator. Also, when an electric pump is incorporated in a hydraulic vehicle operation device, it is important that more effective electric pump control is performed in relation to battery consumption.

Solution(s) to Problem

A hybrid work vehicle according to the present invention includes: an internal combustion engine for supplying driving force to a running device and a work implement via a transmission shaft; a motor generator for assisting the internal combustion engine by outputting power to the transmission shaft; a battery for receiving charging electricity from the motor generator and giving driving electricity to the motor generator; a load information generation unit for generating load information indicating a rotational load received by the internal combustion engine when in a constant-speed control mode for maintaining a constant number of revolutions of the internal combustion engine, based on an input parameter; and an assistance calculation unit for calculating an amount of assistance for the internal combustion engine by the motor generator when in the constant-speed control mode, based on the load information.

With this configuration, if, in the above-described work vehicle, a sudden decrease or increase in the number of engine revolutions is detected or estimated from load information indicating a revolution load received by the internal combustion engine during driving in a constant-speed control mode for maintaining a constant number of engine revolutions that is frequently executed at the time of running for working, the motor generator can be controlled with an assistance amount calculated for adjusting power that is output by the motor generator to the transmission shaft simultaneously with, or prior to, control for operating the internal combustion engine, so as to suppress variation in the number of revolutions.

Note that a sudden decrease in the number of engine revolutions can possibly occur frequently in a case where a bucket sticks into a large clod, in a case where a cultivation depth of a cultivation device becomes large, in a case where a running device such as a wheel goes over an obstacle, or the like. In order to prevent an internal combustion engine from stopping (engine stall) due to such a sudden decrease in the number of engine revolutions, in conventional work vehicles, operation of the internal combustion engine at a high number of revolutions that enables output of torque that significantly exceeds the torque required during a normal work or use of an internal combustion engine having a larger horsepower cannot be avoided, resulting in disadvantage in terms of fuel consumption. This disadvantage is also reduced by the assistance control for the internal combustion engine by the motor generator according to the present invention.

In one specific and preferable embodiment of the present invention in a case where the internal combustion engine is driven using a common-rail system, the load information generation unit generates the load information using common-rail control information as the input parameter. In other words, the control unit that executes common-rail control has a function of estimating load torque from internal combustion engine data such as the fuel injection period, the fuel injection amount, and the number of engine revolutions, as well as vehicle data such as the vehicle speed, calculating the fuel injection period and the fuel injection amount that are necessary for maintaining a predetermined number of engine revolutions and maintaining predetermined torque, and executing the necessary fuel injection period and fuel injection amount. Accordingly, there is an advantage in detection or estimation of a sudden decrease or increase in the number of engine revolutions using the above common-rail control information regarding the common-rail control and calculation of the amount of assistance for the internal combustion engine by the motor generator.

In one of other embodiments of the present invention, the load information generation unit may be configured to generate the load information using behavior of a number of revolutions of the internal combustion engine as the input parameter. Specifically, generation of the load information becomes easy when a variation in the number of revolutions per predetermined time and a variation in the revolution speed are computed from measurement data obtained by measuring the number of rotations of an output shaft of the internal combustion engine and the transmission shaft, which can be relatively easily acquired, an increase/decrease of a load is calculated or estimated to generate the load information from the computation result using a map or the like, and this load information is used in calculation of the assistance amount.

The situation in which a work load occurs varies depending on the work implement to be mounted and used in a work vehicle. For example, there are work implements in which a large momentary variation in a load occurs, and work implements in which a load varies in the course of relatively long time. For this reason, a more appropriate assistance amount can be calculated by taking into account a work load characteristic unique to the work implement when creating the load information. For this purpose, in one preferable embodiment of the present invention, a work load characteristic setting unit for setting a work load characteristic of the work implement is provided, and the work load characteristic is given as an auxiliary parameter to the load information generation unit.

In a work vehicle, a measure to avoid running instability and engine stop due to a sudden increase in a load during running for working, using inertia of a flywheel having a large weight that is coupled to an output shaft of the internal combustion engine. The larger the weight of the flywheel is, the larger the obtained inertia is, and the running is stable even if a work with a large load variation is performed. However, a larger weight of the flywheel, which constantly rotates, adversely affects fuel consumption. The weight of the flywheel can be reduced, or the flywheel can be omitted by considering provision of an at least partial flywheel characteristic, which is an inertia characteristic that has been realized by a conventional flywheel, with an assisting force given by the motor generator, when calculating the assistance amount of the motor generator. For this reason, in one preferable embodiment of the present invention, the assistance calculation unit is configured to calculate the amount of assistance so as to supplement a flywheel characteristic that is appropriate for the internal combustion engine.

A hybrid work vehicle according to the present invention includes: an internal combustion engine for supplying driving force to a running device and a work implement via a transmission shaft; a motor generator for assisting the internal combustion engine by outputting power to the transmission shaft; a battery for receiving charging electricity from the motor generator and giving driving electricity to the motor generator; a load amount calculation unit for calculating a load amount indicating a rotational load received by the internal combustion engine, based on an input parameter; a charging amount calculation unit for calculating a charging amount of the battery; a drive mode selection unit for selecting one drive mode from an assistance drive mode for outputting power to the transmission shaft and a charge drive mode for outputting charging electricity to the battery, based on the load amount and the charging amount; and a motor control unit for controlling drive of the motor generator in a drive mode selected by the drive mode selection unit.

With this configuration, a load amount corresponding to a rotational load received by the internal combustion engine during running for working, as in a cultivating work, is calculated by the load amount calculation unit, and the assistance drive mode is determined to be used, drive of the motor generator is controlled, and the internal combustion engine is assisted based on the calculated load amount and the charging amount calculated by the charging amount calculation unit, unless there is no possibility of the battery going flat. Also, if the rotational load on the internal combustion engine is small and the assistance is not necessary, drive of the motor generator is controlled in the charge drive mode, and the charging amount of the battery increases. Accordingly, since the internal combustion engine is appropriately assisted by the motor generator while the situation in which the battery goes flat is reliably avoided, an internal combustion engine with a small rated power and good fuel consumption can be employed, and the number of engine revolutions can be set to a small number of revolutions with which good fuel consumption is obtained during a constant-speed running work in which a constant number of engine revolutions is attempted to be maintained, which is frequently executed during running for working.

Considering inconvenience of the battery going flat, more weight should be given to battery charging than on the assistance for the internal combustion engine, if the amount of the load on the internal combustion engine is not so large as to lead to stop of the internal combustion engine (engine stall). However, if the amount of the load on the internal combustion engine is so large as to lead to stop of the internal combustion engine (engine stall), it is also important to place more stress on the assistance for the internal combustion engine than on battery charging. For this reason, in one preferable embodiment of the present invention, the assistance drive mode is configured to be selected when the load amount is larger than or equal to a predetermined amount, even in a state where the charging amount is smaller as the load amount is higher.

Also, if power transmission by the transmission shaft is interrupted while the assistance drive mode is selected, the rotational load on the internal combustion engine naturally decreases, and it is therefore convenient to employ a configuration in which the drive mode is forcibly switched from the assistance drive mode to the charge drive mode. Examples of vehicle behavior on which interruption of power transmission by the transmission shaft is seen include disengagement of a main clutch of the transmission shaft, a transmission clutch in a drive transmission mechanism or a PTO clutch for a work implement being at a neutral position, and stop of a work vehicle due to a braking operation.

Furthermore, in a case where a clutch for transmitting power of a transmission shaft is in a half-clutch state, if torque assistance is provided even using the motor generator despite of being under a large rotational load, there is a possibility that large torque is generated at the clutch and the clutch is burnt. To avoid this problem, in one preferable embodiment of the present invention, if a clutch that is transmitting power of the transmission shaft is in a half-clutch state while the assistance drive mode is selected, the assistance drive mode is configured to be forcibly interrupted.

Whether the motor generator assists the internal combustion engine may be determined based on the load amount and the charging amount, and the assistance amount may be constant, but the assistance amount may alternatively be adjusted based on the load amount and the charging amount. In other words, higher-quality assistance process control can be realized by mapping the assistance amount as a function of the load amount and the charging amount, for example.

For this purpose, in one preferable embodiment of the present invention, an assistance calculation unit for calculating an amount of assistance for the internal combustion engine by the motor generator when in the assistance drive mode, based on the load amount is provided.

In one specific and preferable embodiment of the present invention in a case where the internal combustion engine is driven using a common-rail system, the load amount calculation unit calculates the load amount using common-rail control information as the input parameter. In other words, the control unit that executes common-rail control has a function of estimating load torque from internal combustion engine data such as the fuel injection period, the fuel injection amount, and the number of engine revolutions, as well as vehicle data such as the vehicle speed, calculating the fuel injection period and the fuel injection amount that are necessary for maintaining a predetermined number of engine revolutions and maintaining predetermined torque, and executing the necessary fuel injection period and fuel injection amount. Accordingly, it is possible to detect or estimate a sudden decrease or increase in the number of engine revolutions using the above common-rail control information regarding the common-rail control, and easily calculate the load amount without any additional constituent components.

A hybrid vehicle according to the present invention includes: an internal combustion engine for supplying driving force to a running device and a work implement via a transmission shaft; a motor generator for assisting the internal combustion engine by outputting power to the transmission shaft; a hydraulic vehicle operation device in which a hydraulic actuator and an electric-hydraulic pump for supplying hydraulic pressure to the hydraulic actuator are incorporated; a battery for receiving charging electricity from the motor generator, giving driving electricity to the motor generator, and supplying electricity to the electric-hydraulic pump; an operation tool for giving an amount of operation with respect to the hydraulic vehicle operation device; an operation amount detection unit for detecting the amount of operation; a pump rotation number calculation unit for calculating a number of pump rotations of the electric-hydraulic pump that is necessary for supplying hydraulic pressure to the hydraulic actuator, using operation information regarding the amount of operation as an input parameter; and a hydraulic pump control unit for outputting a control signal to the electric-hydraulic pump such that the electric-hydraulic pump is driven at the number of pump rotations calculated by the pump rotation number calculation unit.

With this configuration, the number of pump rotations of the electric-hydraulic pump that should satisfy the hydraulic pressure required by its operation is calculated in accordance with an amount of operation of an operation tool for a hydraulic vehicle operation device, and drive of the electric-hydraulic pump is controlled with a target of the calculated number of pump rotations. Thus, more effective electric pump control is realized in terms of battery consumption, compared with simple control for turning on/off the electric-hydraulic pump.

If the battery goes flat, maintenance of battery quality is adversely affected, and also causes inconvenience of incapability of the vehicle to move. Therefore, the battery should be prevented from going flat. For this reason, it is preferable to take account of the battery charging amount as well as the operability of the hydraulic vehicle operation device, when controlling the number of rotations of the electric-hydraulic pump. Accordingly, in one preferable embodiment of the present invention, a charging amount calculation unit for calculating a charging amount of the battery is provided, and the charging amount is used as an additional input parameter for calculation of the number of pump rotations by the pump rotation number calculation unit.

In one preferable embodiment of the present invention, the operation tool is a steering wheel, the hydraulic vehicle operation device is a power-steering device, and the operation information regarding the amount of operation is at least one of a steering angle and a steering angular velocity. Since a steering operation involving a large steering angle is frequently performed with a work vehicle or the like, it is important to supply an appropriate amount of hydraulic pressure to the hydraulic circuit of a power-steering device. Also, during a steering wheel operation, the necessary amount of hydraulic pressure depends on the angel value of the steering angle, as well as the operation speed, that is, the steering angular velocity during this operation. Accordingly, it is convenient that the number of rotations of the electric-hydraulic pump is calculated based on the steering angle and the steering angular velocity.

The above-described control of the electric-hydraulic pump in the hydraulic vehicle operation device, which optimally suppresses battery consumption, is especially advantageous in a vehicle that is under a strict restriction on battery consumption, such as a hybrid vehicle. For this reason, an exemplary preferable application of the vehicle according to the present invention is an electrically-driven vehicle in which the battery is also used as a running-drive motor generator.

BRIEF DESCRIPTION OF THE DRAWING(S)

DESCRIPTION OF EMBODIMENT(S)

First Embodiment

Figure 1:
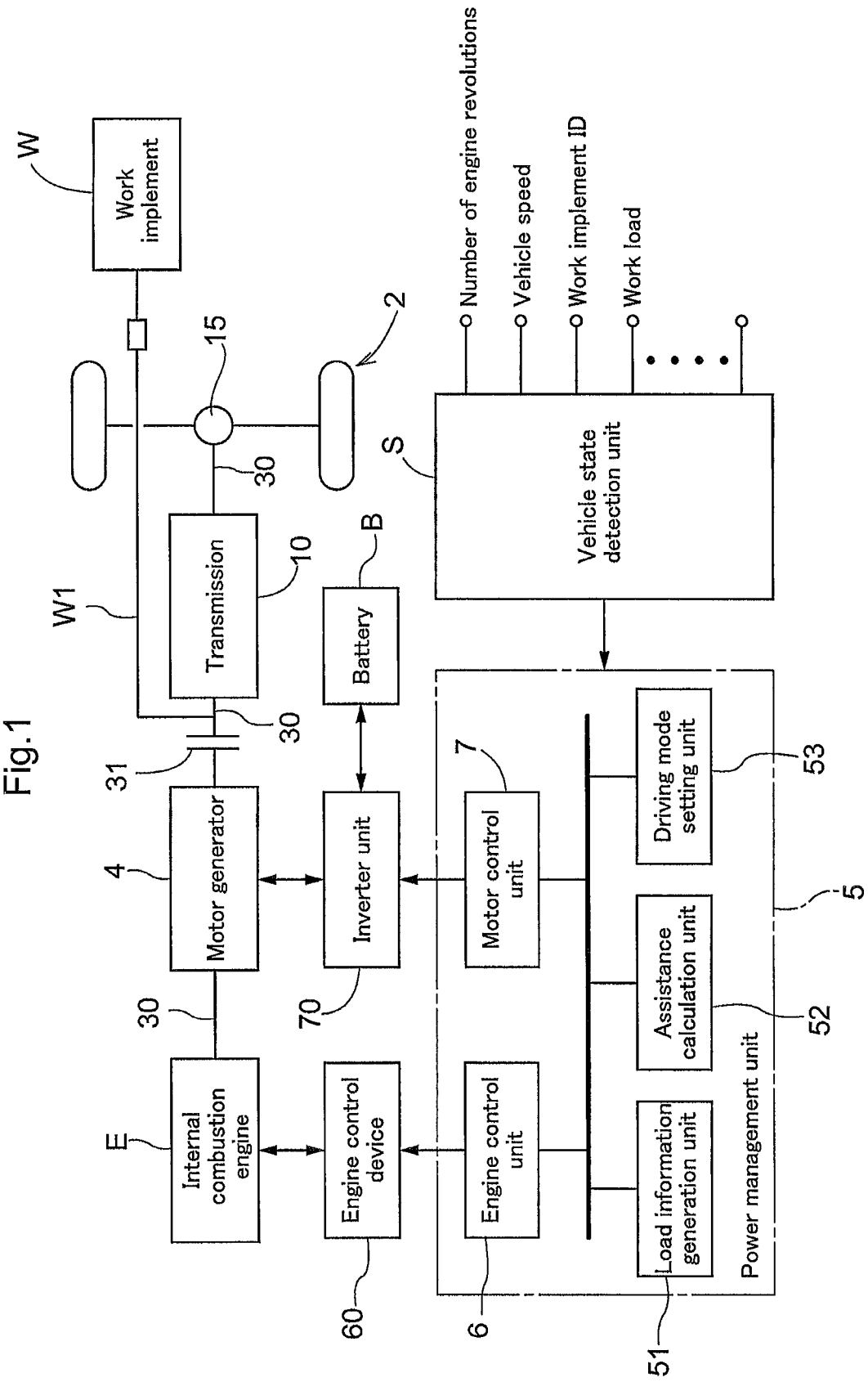
FIG. 1 is a basic configuration diagram of a power system according to a first embodiment of the present invention.

Prior to a detailed description of a first embodiment of the present invention, a basic configuration of a power system employed in the first embodiment will be described using FIG. 1.

This hybrid work vehicle is provided with an internal combustion engine E and a motor generator 4 as driving sources, and performs a running work using a work implement W mounted in the vehicle body while running with a running device 2 constituted by wheels or a crawler. A power transmission system for transmitting power from power reduction includes a clutch 31 for turning on/off transmission of power from the driving sources, a PTO shaft W1 for transmitting power to the work implement W, and a transmission shaft 30 for transmitting power to the running device 2. A transmission 10 provided with a transmission mechanism is constructed on the transmission shaft 30.

The motor generator 4, to which power is supplied from a battery B, generates rotational power and cooperates with the internal combustion engine E to cause the hybrid work vehicle to run, and this motor generator 4 can also function as a generator for supplying electricity to the battery B in a situation where the hybrid work vehicle is driven by the internal combustion engine E, where the hybrid work vehicle is decelerating, or where the hybrid vehicle is running down a slope by inertia.

Revolution of the internal combustion engine E is controlled by an engine control unit 6 via an engine control device 60 such as an electronic governor mechanism or a common-rail mechanism. Driving of the motor generator 4 is controlled by a motor control unit 7 via an inverter unit 70. The engine control unit 6 is a computer unit for controlling a fuel injection amount or the like of the internal combustion engine E, and has a constant-speed control function of controlling the engine control device 60 so as to maintain a constant number of revolutions of the internal combustion engine E. The motor control unit 7 similarly is a computer unit, and gives a control signal to the inverter unit 70 to control the number of rotations and torque of the motor generator 4. Also, the motor control unit 7 is provided with a charge control function of causing the motor generator 4 to function as a generator and charging the battery B via the inverter unit 70.

As is known well, the inverter unit 70 converts direct voltage of the battery B into alternating voltage and supplies it to the motor generator 4, and also functions as a rectifier and a voltage adjustment device for supplying direct voltage to the battery B when the motor generator 4 works as a generator. In other words, the battery B operates in a discharge process of supplying electricity to the motor generator 4 via the inverter unit 70, and also operates in a charge process of being charged with electricity generated by the motor generator 4 when the motor generator 4 operates as a generator.

A power management unit 5 includes, as functional units to which the present invention particularly relates, a load information generation unit 51, an assistance calculation unit 52, and a driving mode setting unit 53 in order to manage assistance control under which the motor generator 4 assists the internal combustion engine E by giving a control command to the engine control unit 6 and the motor control unit 7. The driving mode setting unit 53 is for setting a constant-speed control mode for maintaining a constant number of rotations used during a work using the work implement W that draws rotational power of a constant number of rotations from the PTO shaft W1 and uses the rotational power in the work, and when the work vehicle is caused to run (cruise) at a predetermined speed. When the constant-speed control mode is set, the engine control unit 6 controls the engine control device 60 so as to maintain the number of revolutions of the internal combustion engine E at a predetermined set value.

Although the running itself of the internal combustion engine E in the constant-speed control mode is known well, a situation is caused in which the number of revolutions of the internal combustion engine E decreases as a result of an abrupt load being applied to the transmission shaft 30 depending on a working state of the work implement W or a condition of the ground with which the running device 2 is in contact. At this time, a decrease in the number of revolutions of the internal combustion engine E (decrease in the vehicle speed) or stop of the internal combustion engine E (engine stall) in an extreme case occurs due to a delay in the constant-speed control by the engine control device 60, an insufficient output of the internal combustion engine E itself, or the like. To avoid it, the motor generator 4 is driven in order to detect a load applied to the transmission shaft 30 and at least partially cancel the load, and a torque assistance process of assisting the internal combustion engine E is executed. The load information generation unit 51 and the assistance calculation unit 52 are used for this torque assistance process.

The load information generation unit 51 has a function of generating load information indicating a rotational load received by the internal combustion engine E or the transmission shaft 30 when in the constant-speed control mode, based on input parameters. Note that since the PTO shaft W1 is a branch shaft of the transmission shaft 30, the rotational load received by the transmission shaft 30 naturally includes a rotational load received by the PTO shaft W1. The assistance calculation unit 52 calculates an amount of assistance for the internal combustion engine E by the motor generator 4, based on the load information generated by the load information generation unit 51 when in the constant-speed control mode. The input parameters used by the load information generation unit 51 include the number of revolutions (revolution speed) of the internal combustion engine E, the number of rotations (rotational speed) of the transmission shaft 30, the engine torque calculated by the engine control unit 6, the torque of the transmission shaft 30, the vehicle speed, and the working state of the work implement W (cultivation depth, traction force, force acting on a loader, etc.). The input parameters to be actually used depend on sensors mounted in the work vehicle. Since a rotation detection sensor of the transmission shaft 30 and a vehicle speed sensor are likely to be standard equipment, it is convenient to use a rotational speed variation value of the transmission shaft 30 and a vehicle speed variation value as the input parameters. These input parameters are sent through a vehicle state detection unit S for processing signals from various sensors.

Figure 2:
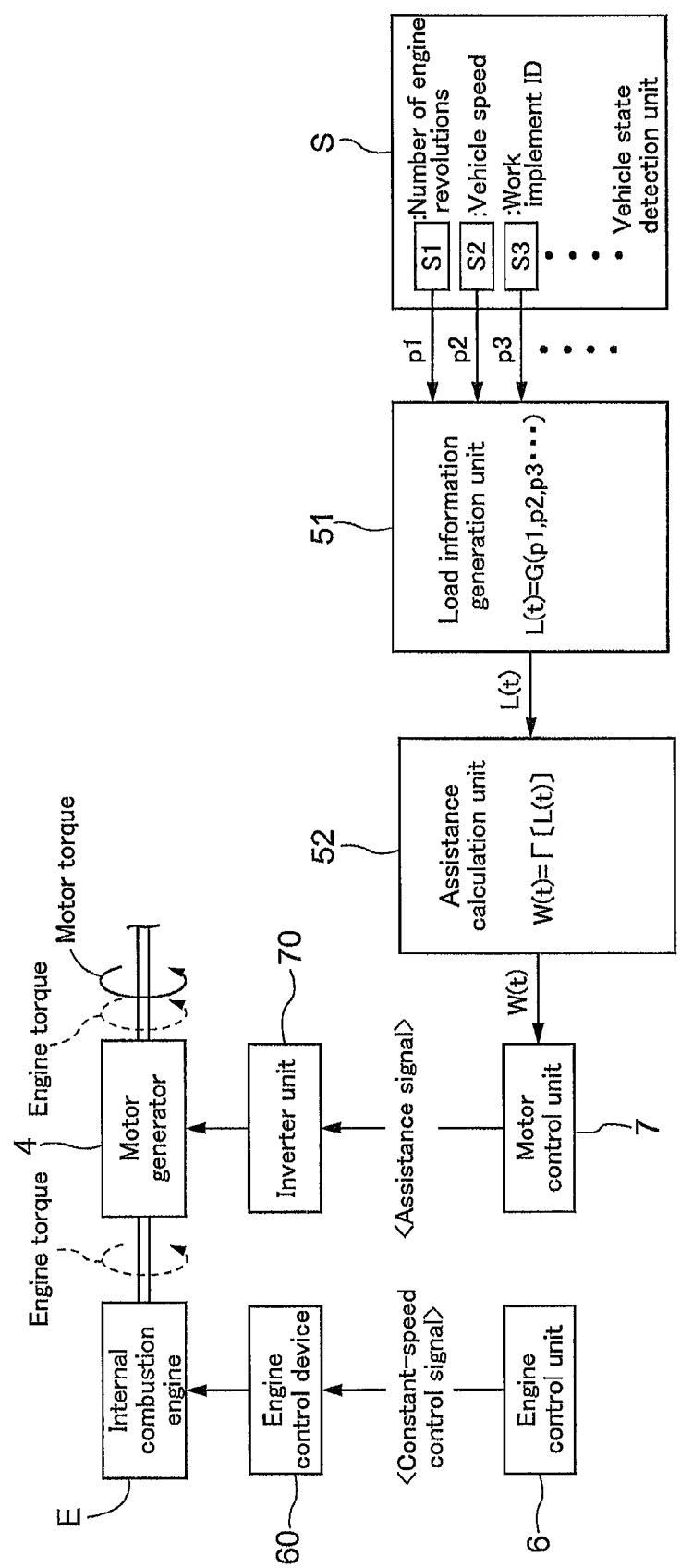
FIG. 2 is a schematic diagram showing a data flow in a torque assistance process executed in the power system in FIG. 1.

FIG. 2 schematically shows a data flow in the torque assistance process. FIG. 2 shows a drive state during a running for constant-speed working, where the engine control unit 6 is sending a constant-speed control signal to the engine control device 60. The constant-speed control signal is a signal for adjusting a fuel injection amount or the like in response to variation in the number of revolutions with a target of a set number of revolutions (revolution speed), and maintaining the number of revolutions of the internal combustion engine E at the target number of revolutions. Since the variation in the number of revolutions in the constant-speed control mode occurs due to variation in the load, the number of revolutions is adjusted so as to correspond to the load variation amount, and as a result, the number of revolutions is maintained at the target number of revolutions. However, since torque responsiveness of the internal combustion engine E is slower than that of motors or the like, the internal combustion engine E cannot sufficiently respond to a sudden increase in the load, resulting in a decrease in the number of revolutions, or engine stall in the worst case. Accordingly, in the constant-speed control mode, the motor control unit 7 sends an assistance signal to the inverter unit 70, and torque assistance is performed for the internal combustion engine E using a motor (here, the motor generator 4) having a much higher torque responsiveness than that of the internal combustion engine E, so as to cover the low torque responsiveness of the internal combustion engine E at the time of variation in the load.

In the torque assistance process, the load information generation unit 51 inputs, as the input parameters, measured values such as the number of rotations (rotational speed) of the transmission shaft 30 and the vehicle speed that are output from the vehicle state detection unit S, and thus generates the load information. Assuming that the input parameters are p1, p2, . . . , the load information: L[t], which is associated with time, is derived from a conversion formula: $L[t]=G(p1, p2, \ldots )$, and this conversion function: $G(p1, p2, \ldots )$ are usually mapped.

Further, the load information: L[t] is given to the assistance calculation unit 52, and the amount of assistance: W(t) for the internal combustion engine E by the motor generator 4 is thereby calculated using a conversion formula: $W(t)=\Gamma[L[t]]$. This conversion function: $\Gamma[L[t]]$ is usually mapped as well.

After the assistance amount is calculated, the motor control unit 7 generates an assistance control signal based on the assistance amount, controls drive of the motor generator 4 via the inverter unit 70, and at least partially cancels variation in the torque generated on the transmission shaft 30. Since the torque responsiveness of the electric motor is much faster than that of the internal combustion engine E, an abrupt decrease in the number of revolutions can be avoided even if a sudden running load or work load is generated. In the case where the load continues to increase, it can be handled by control concerning the internal combustion engine E, such as increasing of the fuel injection amount by the engine control unit 6.

The torque assistance by the motor generator 4, which is excellent in torque responsiveness, can achieve, at least partially, the function of a flywheel that is conventionally mounted, and the weight of the flywheel can be reduced, or the flywheel can be omitted. For this reason, it is preferable to establish the aforementioned conversion function: $G(p1, p2, \ldots )$ and the conversion function: $\Gamma[L[t]]$ such that inertia characteristics of the flywheel are realized. Note that a configuration may be employed in which the load information generation unit 51 and the assistance calculation unit 52 may be integrated and the assistance amount is derived directly from the input parameters.

Figure 3:
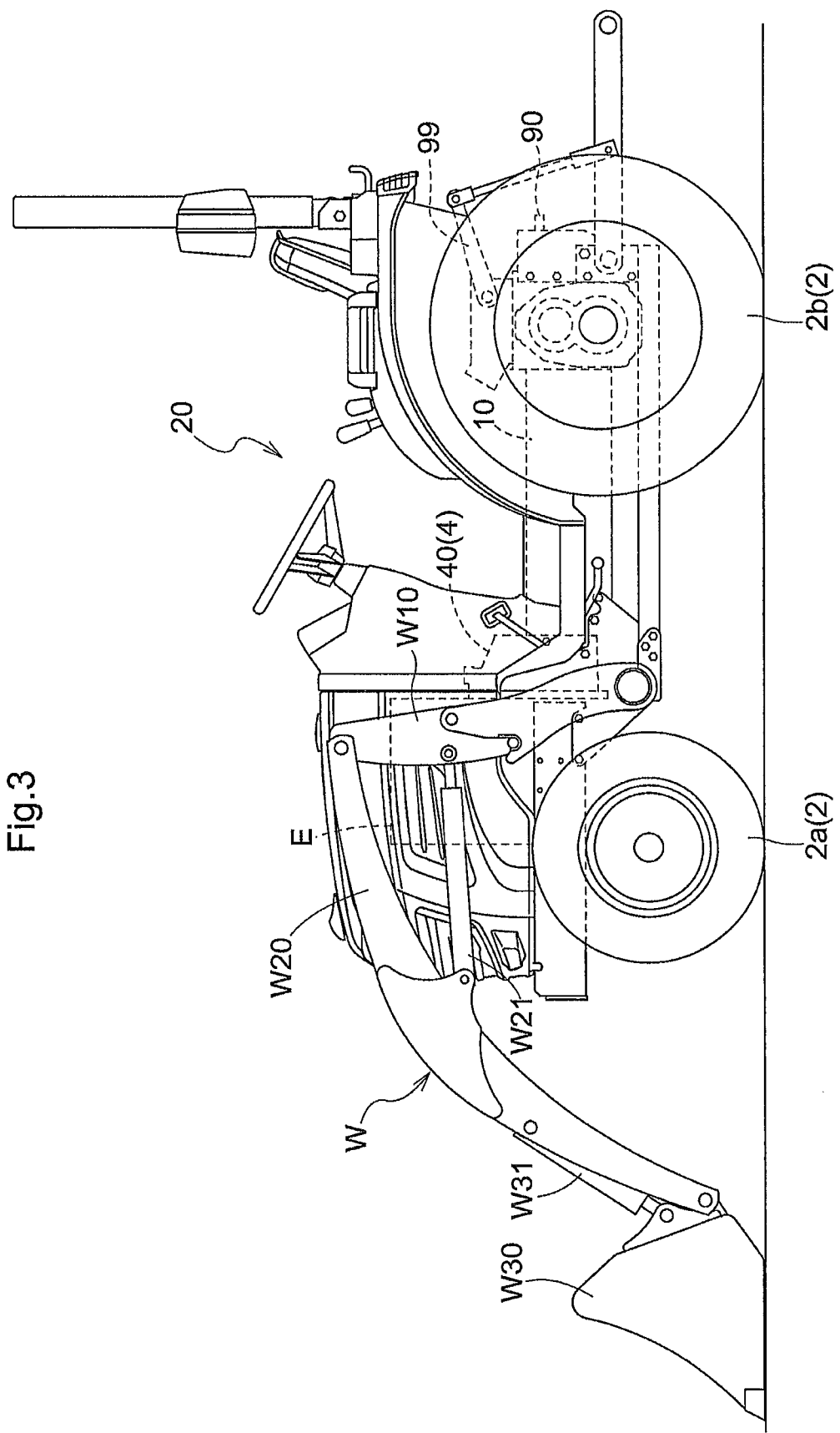
FIG. 3 is a side view of a tractor, which is the first embodiment of the present invention.
Figure 4:
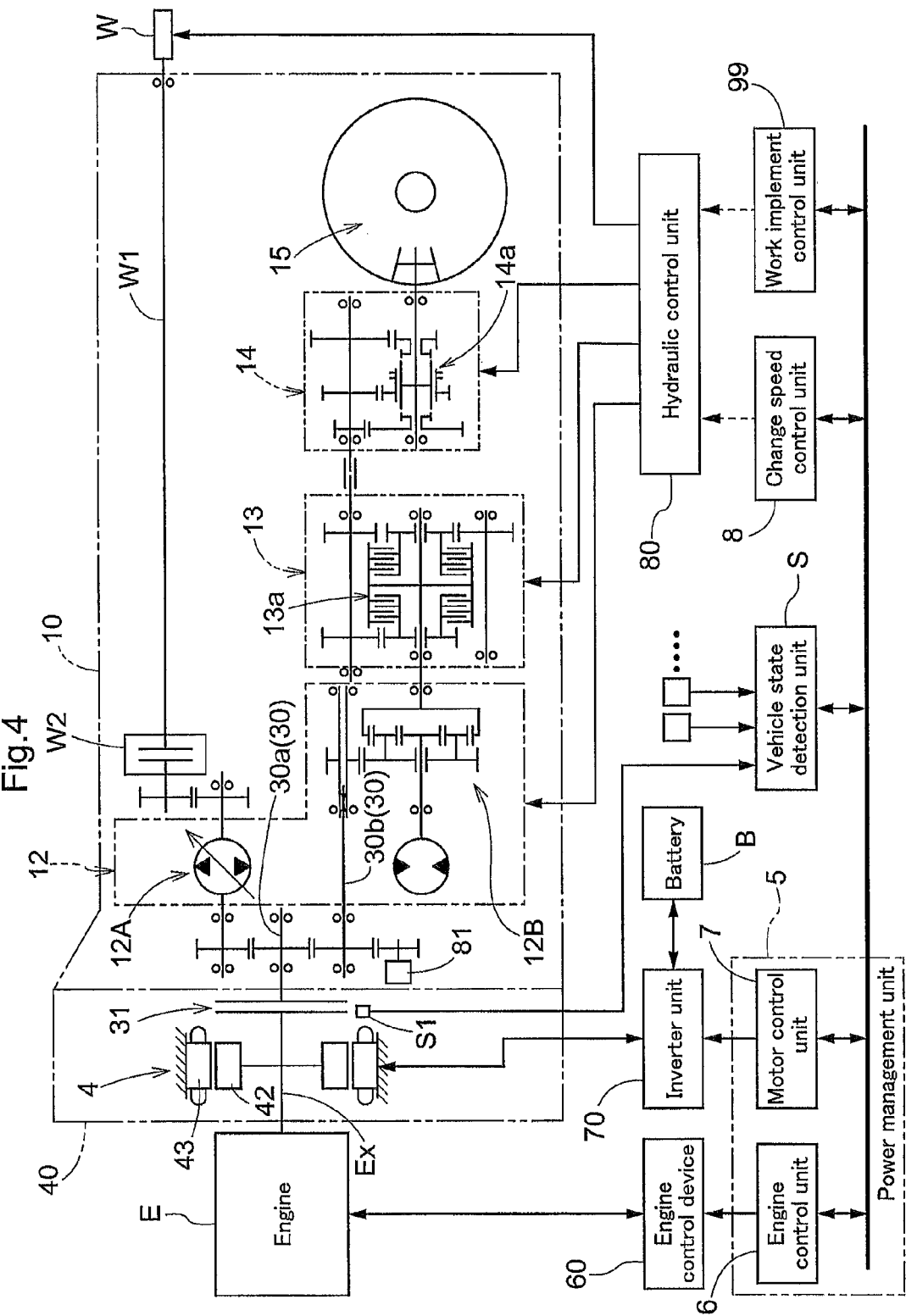
FIG. 4 is a schematic diagram showing a power system of a tractor.
Figure 5:
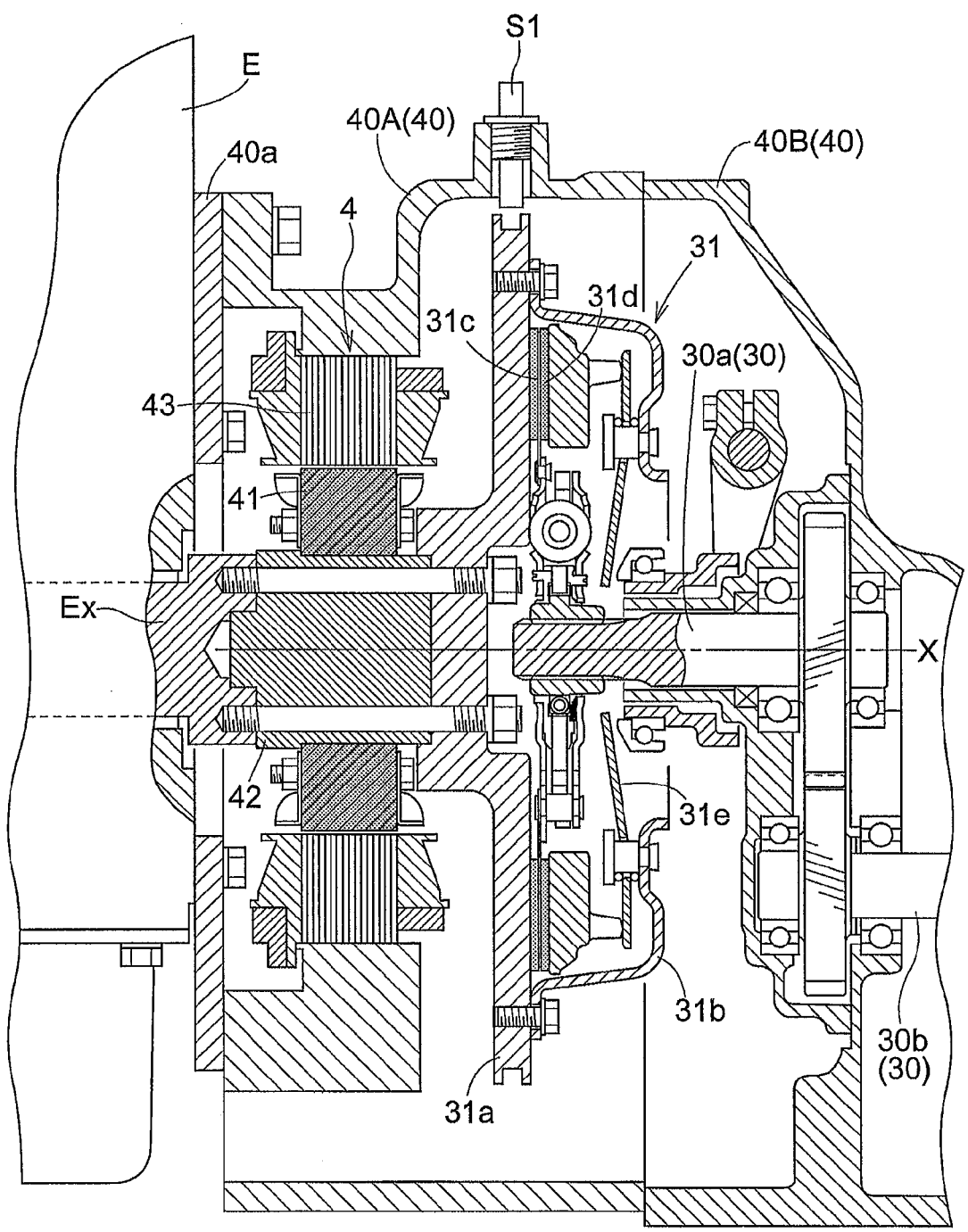
FIG. 5 is a cross-sectional view of a motor generator mounted in a tractor.

Next, a specific embodiment of the present invention will be described. In this embodiment, the hybrid work vehicle is a tractor that functions as a front loader, FIG. 3 is a side view of the tractor, and FIG. 4 is a schematic diagram showing a power system of the tractor. FIG. 5 is a cross-sectional view showing the motor generator 4 attached to the rear part of the engine.

As shown in FIG. 3, the vehicle body of the tractor is provided with the internal combustion engine E, the motor generator 4, the clutch 31, the transmission 10, a driving section 20, a pair of right and left front wheels 2a and a pair of right and left rear wheels 2b that serve as the running device 2, and the like, and a front part of the vehicle body is further equipped with the front loader that serves as the work implement W. The front loader W is equipped with a support frame W10 provided in an upright manner at the rear portion of each of the right and left front wheels 2a, a boom assembly W20 pivotably supported and coupled to the support frame W10, and a bucket W30 pivotably supported and coupled to the tip of the boom assembly W20. The boom assembly W20 is driven by a boom cylinder W21, and the bucket W30 is driven by a bucket cylinder W31. Hydraulic actuators such as the boom cylinder W21 and the bucket cylinder W31a are hydraulically operated by hydraulic valve units (not shown).

Furthermore, the PTO shaft W1, to which power whose speed has not been changed by the transmission 10 is output, protrudes from the rear part of the tractor. Furthermore, the rear part of the vehicle body is equipped with a pair of right and left lifting arms 99. The right and left lifting arms 99 allow the work implement W, such as a rotary cultivation machine or a plow, to be coupled so as to be able to move up and down. Power from the PTO shaft W1 is supplied to a drive-type work implement W such as a rotary cultivation machine.

As schematically shown in FIG. 4, the internal combustion engine E in this tractor is a diesel engine (hereinafter abbreviated as an "engine E") whose revolution is controlled using a common-rail system, and is provided with a common-rail control device as the engine control device 60. The transmission 10 includes a hydraulic-mechanical continuously variable transmission (hereinafter abbreviated as the "HMT") 12, a forward/backward travel switching device 13, an auxiliary transmission 14 for shifting between multiple gears (here, two gears, namely high and low gears), and a differential mechanism 15, and the power of the transmission 10 eventually rotates drive wheels (the front wheels 2a and/or the rear wheels 2b) 2 through the transmission shaft 30. Furthermore, it can transmit power to the work implement W mounted in the tractor through the PTO shaft W1, which constitutes a part of the transmission shaft 30 for transmitting the rotational power of the engine E and the motor generator 4.

The HMT 12 is constituted by a hydrostatic transmission mechanism 12A including a swash plate-type variable delivery hydraulic pump for receiving power from the engine E and the motor generator 4 and a hydraulic motor that rotates due to hydraulic pressure from the hydraulic pump and outputs power, and a planet gear mechanism 12B. The planet gear mechanism 12B is configured to receive an input, which is the power from the engine E and the motor generator 4 and the power from the hydraulic motor, and supply a variable-speed output thereof to the transmission shaft 30 in the latter stage.

In this hydrostatic transmission mechanism 12A, the power from the engine E and the motor generator 4 is input to a pump shaft, hydraulic fluid is thereby supplied from the hydraulic pump to the hydraulic motor, and the hydraulic motor is driven to rotate by the hydraulic pressure from the hydraulic pump and rotates the motor shaft. The rotation of the hydraulic motor is transmitted to the planet gear mechanism 12B through the motor shaft. The hydrostatic transmission mechanism 12A displaces a cylinder interlocked with a swash plate of the hydraulic pump to change the angle of the swash plate, the gear position is shifted to a normal rotation state, a reverse rotation state, or a neutral state positioned between the normal rotation state and the reverse rotation state, and continuously changes the rotational speed (number of rotations per hour) of the hydraulic motor by continuously changing the rotational speed of the hydraulic pump in both cases where the gear position is shifted to the normal rotation state and where it is shifted to the reverse rotation state. As a result, the rotational speed of the power that is output from the hydraulic motor to the planet gear mechanism 12B is continuously changed. The hydrostatic transmission mechanism 12A stops the rotation of the hydraulic motor by the hydraulic pump, and eventually stops the output from the hydraulic motor to the planet gear mechanism 12B as a result of the swash plate being positioned in the neutral state.

The planet gear mechanism 12B is provided with a sun gear, three planet gears that are disposed in a dispersed manner at regular intervals around the sun gear, a carrier for rotatably supporting the planet gears, a ring gear that meshes with the three planet gears, and an output shaft (part of the transmission shaft 30) coupled to the forward/backward travel switching device 13. Note that in the present embodiment, the carrier forms an outer-circumferential gear portion that meshes with an output gear attached to the transmission shaft 30 on the engine E side, and is relatively-rotatably supported by a boss portion of the sun gear.

With the above-described configuration, the HMT 12 can continuously shift the speed of power transmission to the drive wheels 2 by changing the angle of the swash plate in the hydrostatic transmission mechanism 12A. This swash plate control is realized by hydraulic control by a hydraulic control unit 80 that operates based on a control command from a change speed control unit 8.

Control of the motor generator 4 in this power system, that is, the torque assistance for the engine E is performed by the power management unit 5, and here, the power management unit 5 uses the configuration that was described using FIGS. 1 and 2. The power management unit 5, the engine control unit 6, and the vehicle state detection unit S are connected so as to be able to transmit data via an in-vehicle LAN.

The vehicle state detection unit S inputs signals from various sensors installed on the tractor and operation input signals indicating states of operation devices operated by a driver, performs signal conversion and evaluation calculation as necessary, and sends obtained signals and data to the in-vehicle LAN.

The change speed control unit 8 for shifting operation in the transmission 10 and a work implement control unit 99 for operation of the work implement W serve as superordinate electronic devices for giving control commands to the hydraulic control unit 80 that performs hydraulic control in the tractor, and are connected to the hydraulic control unit 80. Note that the hydraulic pressure used here is supplied by a hydraulic pump 81 that is driven by a pump shaft branched from the transmission shaft 30. The change speed control unit 8 and the work implement control unit 99 are also connected to the in-vehicle LAN, and can exchange data with other units.

As shown in FIG. 5, a motor housing 40 for accommodating the motor generator 4 and the clutch 31 is provided on the back face side of the engine E, and the transmission shaft 30 protruding from the rear part of the motor housing 40 transmits the power of the engine E and the motor generator 4 to the transmission 10 installed in the vicinity of the rear wheels 2b.

The motor generator 4 functions both as a three-phase alternating-current generator for generating electricity with driving force of the engine E and as a three-phase alternating-current motor that rotates with electricity supplied from the outside. As described above using FIG. 1, the inverter unit 70 converts direct-current power from the battery B into three-phase alternating-current power and supplies it to the motor generator 4. Also, the inverter unit 70 converts the three-phase alternating current generated by the motor generator 4 into direct current, boosts it, and supplies it to the battery B.

As shown in FIG. 4, the engine E, the motor generator 4, and the clutch 31 are provided in this order, the motor housing 40 is coupled to a rear-end plate 40a coupled to the rear part of the engine E, and thus, the motor generator 4 and the clutch 31 are accommodated in the motor housing 40.

The motor generator 4 is constituted by a rotor 42 provided with an outer-circumferential permanent magnet 41 and a stator 43 disposed at a position surrounding the rotor 42, and the stator 43 has a structure in which a plurality of teeth portions (not shown) of a stator core are wound by a coil. The rotor 42 of the motor generator 4 is disposed so as to face a shaft end of an output shaft Ex (clunk shaft) of the engine E and to be coaxial with a rotational axis X of the output shaft Ex, a base plate 31a of the clutch 31 is disposed in a face of the rotor 42 opposite to the output shaft Ex, and the output shaft Ex, the rotor 42, and the base plate 31a of the clutch 31 are coupled by screws. Although the base plate 31a also functions as a flywheel, the weight of the base plate 31a is lighter than conventional one since, as described above, the motor generator 4 partially performs the inertia force function that has been achieved by the flywheel.

The motor housing 40 has a structure in which a front housing 40A and a rear housing 40B are separably coupled, and when the motor generator 4 is assembled, the front housing 40A is coupled to the rear-end plate 40a in a state where the stator 43 is put in an inner face of the front housing 40A, and then, the rotor 42 is coupled to the rear end of the output shaft Ex.

In the clutch 31, a clutch disk 31c, a pressure plate 31d, and a diaphragm spring 31e are disposed within a clutch cover 31b coupled to the back face of the base plate 31a. The clutch 31 is provided with a clutch shaft 30a, which serves as a constituent component of the transmission shaft 30 to which driving force from the clutch disk 31c is transmitted, and is operated with a clutch pedal (not shown).

The clutch shaft 30a is supported rotatably around a rotational axis X relative to the rear housing 40B, the clutch disk 31c is supported in a manner in which torque can be freely transmitted to the clutch shaft 30a due to a spline structure, as well as in a displaceable manner along the rotation axis X, and the diaphragm spring 31e has a structure in which biasing force in a clutch-on direction is caused to work on the clutch disk 31c via the pressure plate 31d. Also, power of the clutch shaft 30a is transmitted to an intermediate transmission shaft 30b, which is one of constituent component of the transmission shaft 30 and serves as an input shaft of the transmission 10 via a gear transmission mechanism.

The control for driving the engine E and the motor generator 4 is performed by the power management unit 5 that was described in FIG. 1. To control fuel injection by a fuel injector using a common-rail system, which serves as the engine control device 60, the engine control unit 6 acquires a signal from an accelerator pedal sensor, an engine revolution signal, a signal indicating fuel pressure within the common-rail, a signal indicating intake pressure at an air intake position, and the like, and performs control for determining a timing of operating the injector. With this configuration, the engine control unit 6 can also calculate a load factor (engine load factor) of the engine E, and give the engine load factor as an input parameter used in the torque assistance process to the power management unit 5.

An input parameter that can be easily used in the torque assistance process is the number of rotations (rotational speed) of the transmission shaft 30. A rotational speed sensor S1 for detecting the number of rotations of the number of rotations of the transmission shaft 30 is inserted into a hole that penetrates a wall face of the motor housing 40, and its sensing portion at the lower end is located near the outer circumferential face of the base plate 31a of the clutch 31. In other words, the rotational speed sensor S1 is configured as a pickup sensor that counts rotations of the base plate 31a based on a change in magnetic flux density. Of course an optical sensor may be employed as the rotational speed sensor S1, and a configuration in which the number of rotations of the transmission shaft 30 is detected may be employed.

In the tractor having the above-described configuration, normally, the engine control unit 6 included in the power management unit 5 executes control for operating the engine E in a fuel-efficient low-speed zone. Also, if the load working on the engine E is deemed to be smaller than a threshold value, based on engine information acquired by the engine control unit 6 itself or vehicle state information sent from the vehicle state detection unit, control is executed under which electricity generated by the motor generator 4 is supplied to the battery B via the inverter unit 70 to charge the battery B.

On the other hand, if the load working on the engine E is deemed to exceed the threshold value, electricity from the battery B is supplied as the three-phase alternating-current power to the motor generator 4 via the inverter unit 70 that is driven based on a control signal from the motor control unit 7, and the engine E is assisted using driving force of the motor generator 4. In particular, if a reduction in the number of engine revolutions is detected due to a sudden increase in the engine load during a constant-speed work, the torque assistance process using the motor generator 4 is executed so as to at least partially cancel the increase in the engine load, thereby avoiding an unexpected decrease in the number of engine revolutions and engine stall.

Here, typical modifications of the above-described first embodiment are described.

(1) Although the above-described first embodiment uses the number of engine revolutions or the number of rotations of the transmission shaft to detect the load working on the engine E, a load detection sensor may be provided directly in the work implement W, and the torque assistance amount of the motor generator 4 may be calculated using a load detection signal of the load detection sensor as an input parameter.

(2) Also, if torque larger than or equal to a predetermined level is applied to the engine E, the motor generator 4 may be constantly driven and the torque assistance for the engine E may be executed by performing control for maintaining the number of rotations of the motor generator 4 using a change in current and voltage that run through the motor generator 4.

Second Embodiment

Figure 6:
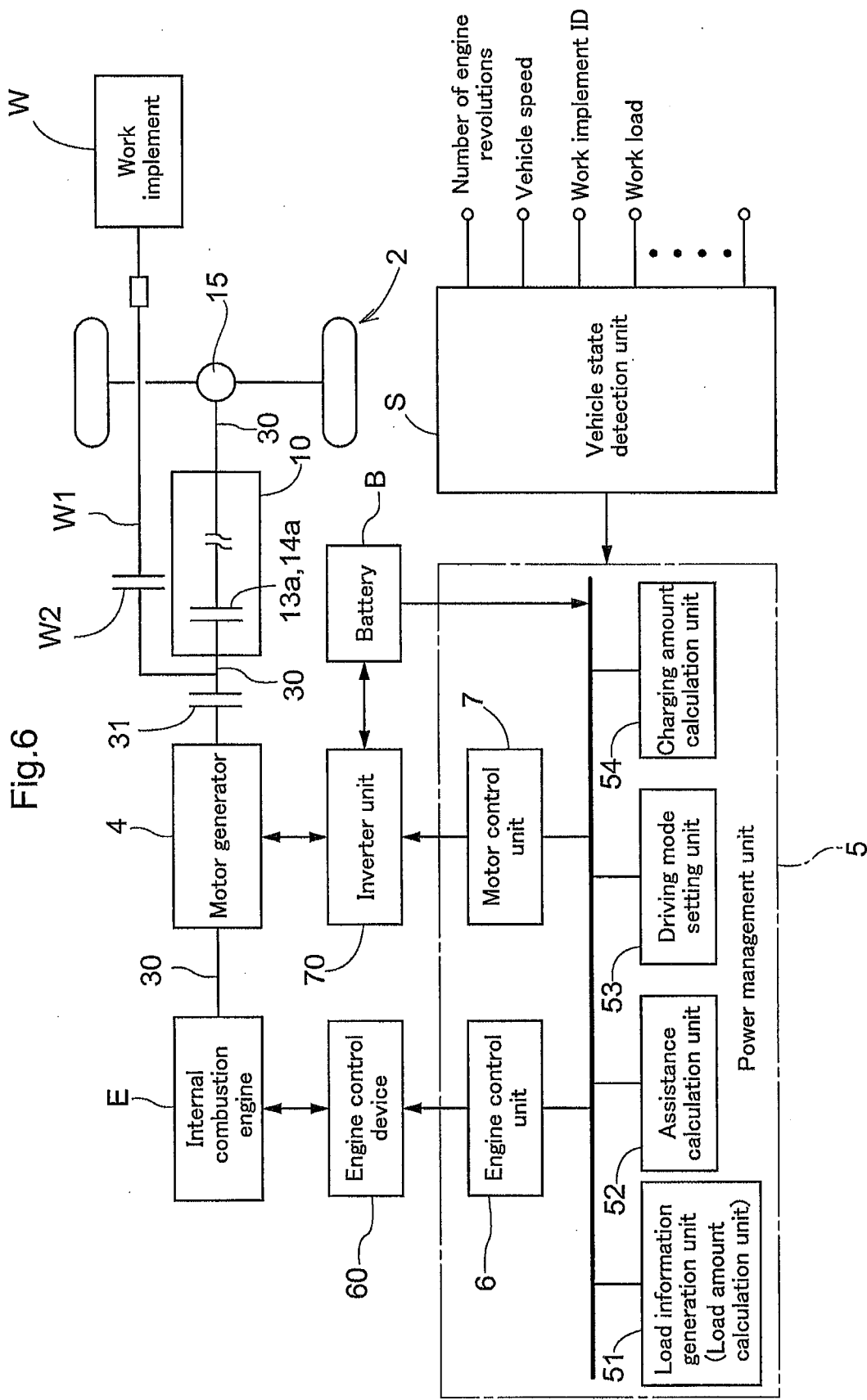
FIG. 6 is a basic configuration diagram of a power system according to a second embodiment in a hybrid work vehicle according to the present invention.

Prior to a detailed description of a second embodiment of the present invention, a basic configuration of a power system employed in the second embodiment will be described using FIG. 6. Note that the basic configuration of this power system is similar to the basic configuration of the power system in FIG. 1, and the description using FIG. 1 should be referred to for the details not described here.

This hybrid work vehicle is provided with an internal combustion engine E and a motor generator 4 as driving sources, and performs a running work using a work implement W mounted in the vehicle body while running with a running device 2 constituted by wheels or a crawler. A power transmission system for transmitting power from a driving sources includes a main clutch 31 for turning on/off transmission of power from the driving sources, a PTO shaft W1 for transmitting power to the work implement W, and a transmission shaft 30 for transmitting power to the running device 2. A transmission 10 provided with a transmission mechanism is constructed on the transmission shaft 30. Note that a PTO clutch W2 for turning on/off power transmission is disposed on the path of the PTO shaft W1, and the transmission 10 is also equipped with one or more transmission clutches 13a and 14a for turning on/off power transmission.

In this embodiment, the power management unit 5 includes a load information generation unit 51 constructed as a load amount calculation unit, an assistance calculation unit 52, a driving mode setting unit 53, and a charging amount calculation unit 54 in order to give a control command to the engine control unit 6 and the motor control unit 7 and thereby manage assistance control for the motor generator 4 assisting the internal combustion engine E. The charging amount calculation unit 54 calculates a charging amount of the battery B. At this time, the charging amount of the battery is calculated based on battery state information from the battery B if the battery is configured to be an intelligent battery unit provided with a computer, and, if not, the charging amount of the battery B is calculated based on battery state information from a vehicle state detection unit S that has received a signal from a battery state detection sensor.

The driving mode setting unit 53 is for selecting one drive mode from an assistance drive mode for outputting power to the transmission shaft 30 and a charge drive mode for outputting charging electricity to the battery B, based on the amount of a load applied to the internal combustion engine E or the transmission shaft 30 and the charging amount of the battery B. If a zero-torque drive mode is prepared, of course this drive mode is selected as necessary. Also, the driving mode setting unit 53 sets a constant-speed control mode for maintaining a constant number of rotations used during a work using the work implement W that draws rotational power of a certain number of rotations from the PTO shaft W1 and uses the rotational power in the work, and when the work vehicle is caused to run (cruise) at a predetermined speed. When the constant-speed control mode is set, the engine control unit 6 controls the engine control device 60 so as to maintain the number of revolutions of the internal combustion engine E at a predetermined set value. The motor control unit 7 controls drive of the motor generator 4 using the inverter unit 70 in the drive mode selected by the driving mode setting unit 53.

Although the running itself of the internal combustion engine E in the constant-speed control mode is known well, a situation is caused in which the number of revolutions of the internal combustion engine E decreases as a result of an abrupt load being applied to the transmission shaft 30 depending on a working state of the work implement W or a condition of the ground with which the running device 2 is in contact. At this time, a decrease in the number of revolutions of the internal combustion engine E (decrease in the vehicle speed), or stop of the internal combustion engine E (engine stall) in an extreme case occurs due to a delay in the constant-speed control by the engine control device 60, an insufficient output of the internal combustion engine E itself, or the like. To avoid it, the motor generator 4 is driven in order to detect a load applied to the transmission shaft 30 and at least partially cancel the load, and a torque assistance process of assisting the internal combustion engine E is executed. The load amount calculation unit 51 and the assistance calculation unit 52 are used for this torque assistance process.

The load amount calculation unit (load information generation unit) 51 has a function of generating a load amount indicating a rotational load received by the internal combustion engine E or the transmission shaft 30, based on an input parameter. Note that since the PTO shaft W1 is a branch shaft of the transmission shaft 30, the rotational load received by the transmission shaft 30 naturally includes a rotational load received by the PTO shaft W1. The assistance calculation unit 52 calculates an amount of assistance for the internal combustion engine E by the motor generator 4, based on the load amount generated by the load amount calculation unit 51 when in the constant-speed control mode. The input parameters used by the load amount calculation unit 51 include the number of revolutions (revolution speed) of the internal combustion engine E, the number of rotations (rotational speed) of the transmission shaft 30, the engine torque calculated by the engine control unit 6, the torque of the transmission shaft 30, the vehicle speed, and the working state of the work implement W (cultivation depth, traction force, force acting on a loader, etc.). The input parameters to be actually used depend on sensors mounted in the work vehicle. Since a rotation detection sensor of the transmission shaft 30 and a vehicle speed sensor are likely to be standard equipment, it is convenient to use a rotational speed variation value of the transmission shaft 30 and a vehicle speed variation value as the input parameters. These input parameters are sent through a vehicle state detection unit S for processing signals from various sensors.

Figure 7:
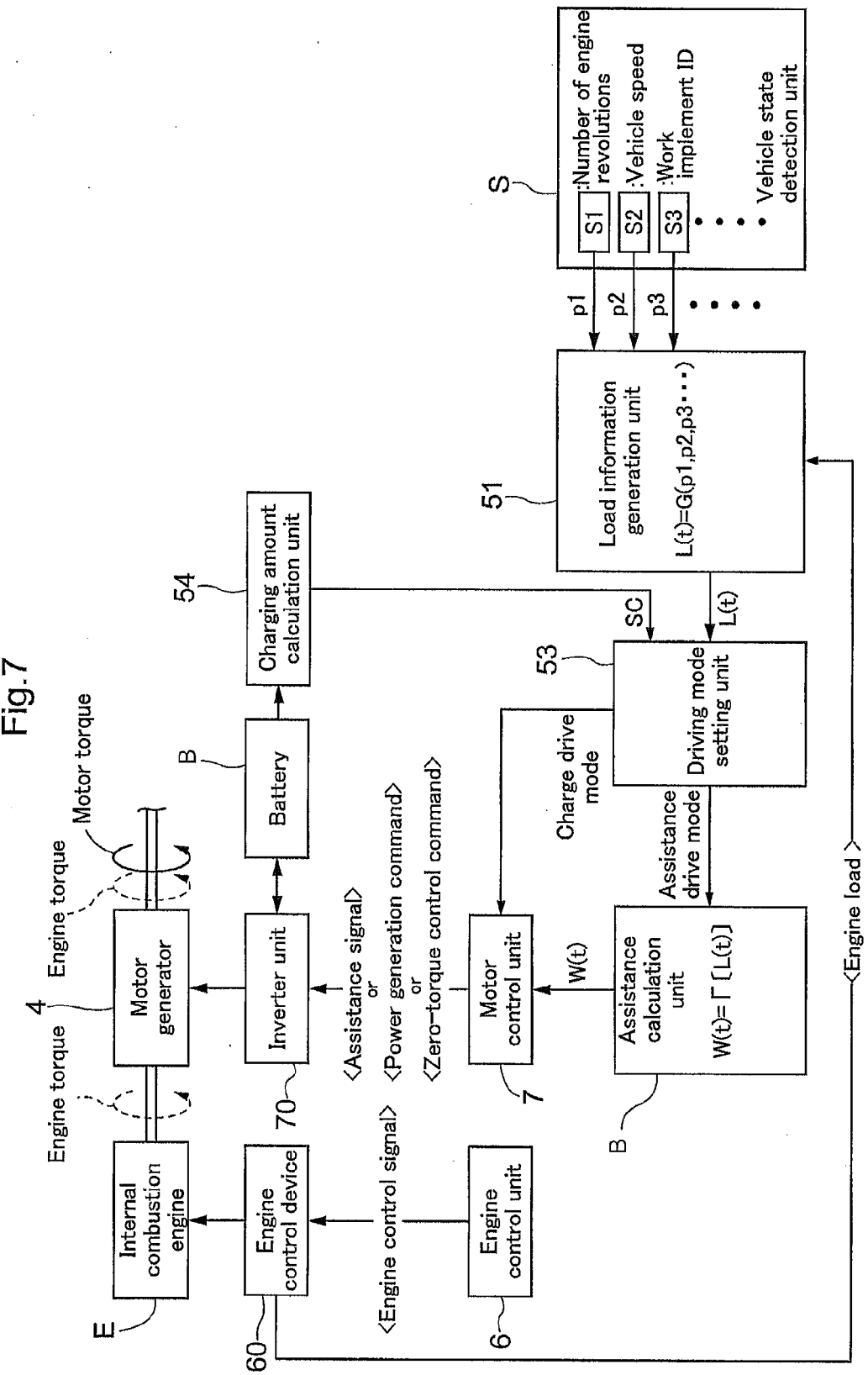
FIG. 7 is a schematic diagram showing a data flow in a torque assistance process executed in the power system in FIG. 6.

FIG. 7 schematically shows a data flow in the torque assistance process. FIG. 7 shows a drive state during running for working, where the engine control unit 6 is sending an engine control signal based on a set value that is set by an acceleration setting device to the engine control device 60. A fuel injection amount and the like are adjusted and the internal combustion engine E is driven, based on the engine control signal. Since variation in the number of revolutions of the internal combustion engine E occurs due to variation in external factors, that is, variation in loads such as a running load and a work load, the fuel injection amount and the like are adjusted to increase the torque so as not to cause an unexpected reduction in the number of revolutions or engine stall due to the amount of such a load variation. However, since torque responsiveness of the internal combustion engine E is slower than that of motors or the like, the internal combustion engine E cannot sufficiently respond to a sudden increase in the load, resulting in a decrease in the number of revolutions, or engine stall in the worst case. For this reason, the motor control unit 7 sends an assistance signal to the inverter unit 70, and torque assistance is performed for the internal combustion engine E using a motor (here, the motor generator 4) having a much higher torque responsiveness than that of the internal combustion engine E, so as to cover the low torque responsiveness of the internal combustion engine E at the time of variation in the load.

In the torque assistance process, the load amount calculation unit 51 inputs, as the input parameter, measured values such as the number of rotations (rotational speed) of the transmission shaft 30 and the vehicle speed that are output from the vehicle state detection unit S, and thus calculates the load amount. Assuming that the input parameters are p1, p2, . . . , the load amount: L[t], which is associated with time, is derived from a conversion formula: L[t]=G(p1, p2, . . . ), and this conversion function: G(p1, p2, . . . ) are usually mapped. The charging amount calculation unit 54 calculates a charging amount (generally called "SOC"): SC based on charging information from the battery B.

The driving mode setting unit 53 selects one drive mode from the assistance drive mode, the charge drive mode, and the zero-torque drive mode if it is prepared, based on the calculated load amount: L[t] and charging amount: SC, using a determination map that is prepared in advance. If the driving mode setting unit 53 selects the assistance drive mode, the amount of assistance: W(t) for the internal combustion engine E by the motor generator 4 is further calculated with a conversion formula: W(t)=Γ[L[t]] as a result of the load amount: L[t] being given to the assistance calculation unit 52, and the conversion function:Γ[L[t]] is usually mapped as well. Note that the load amount: L[t] does not necessarily have to be associated with time.

After the assistance amount is calculated, the motor control unit 7 generates an assistance control signal based on the assistance amount, controls drive of the motor generator 4 via the inverter unit 70, and at least partially cancels variation in the torque generated on the transmission shaft 30. Since the torque responsiveness of the electric motor is much faster than that of the internal combustion engine E, an abrupt decrease in the number of revolutions can be avoided even if a sudden running load or work load is generated. In the case where the load continues to increase, it can be handled by control concerning the internal combustion engine E, such as increasing of the fuel injection amount by the engine control unit 6.

If the driving mode setting unit 53 selects the charge drive mode, the inverter unit 70 operates for electricity generation control as a result of the motor control unit 7 sending an electricity generation command to the inverter unit 70, the electricity generated by the motor generator 4 is sent to the battery B, and the battery B is thus charged. If the driving mode setting unit 53 selects the zero-torque drive mode, the motor generator 4 performs zero-torque drive as a result of the motor control unit 7 sending a zero-torque control signal to the inverter unit 70.

The torque assistance by the motor generator 4, which is excellent in torque responsiveness, can achieve, at least partially, the function of a flywheel that is conventionally mounted, and the weight of the flywheel can be reduced, or the flywheel can be omitted. For this reason, it is preferable to establish the aforementioned conversion function: G(p1, p2, . . . ) and the conversion function: Γ[L[t]] such that inertia characteristics of the flywheel are realized. Note that a configuration may be employed in which the load amount calculation unit 51 and the assistance calculation unit 52 may be integrated and the assistance amount is derived directly from the input parameters.

Figure 8:
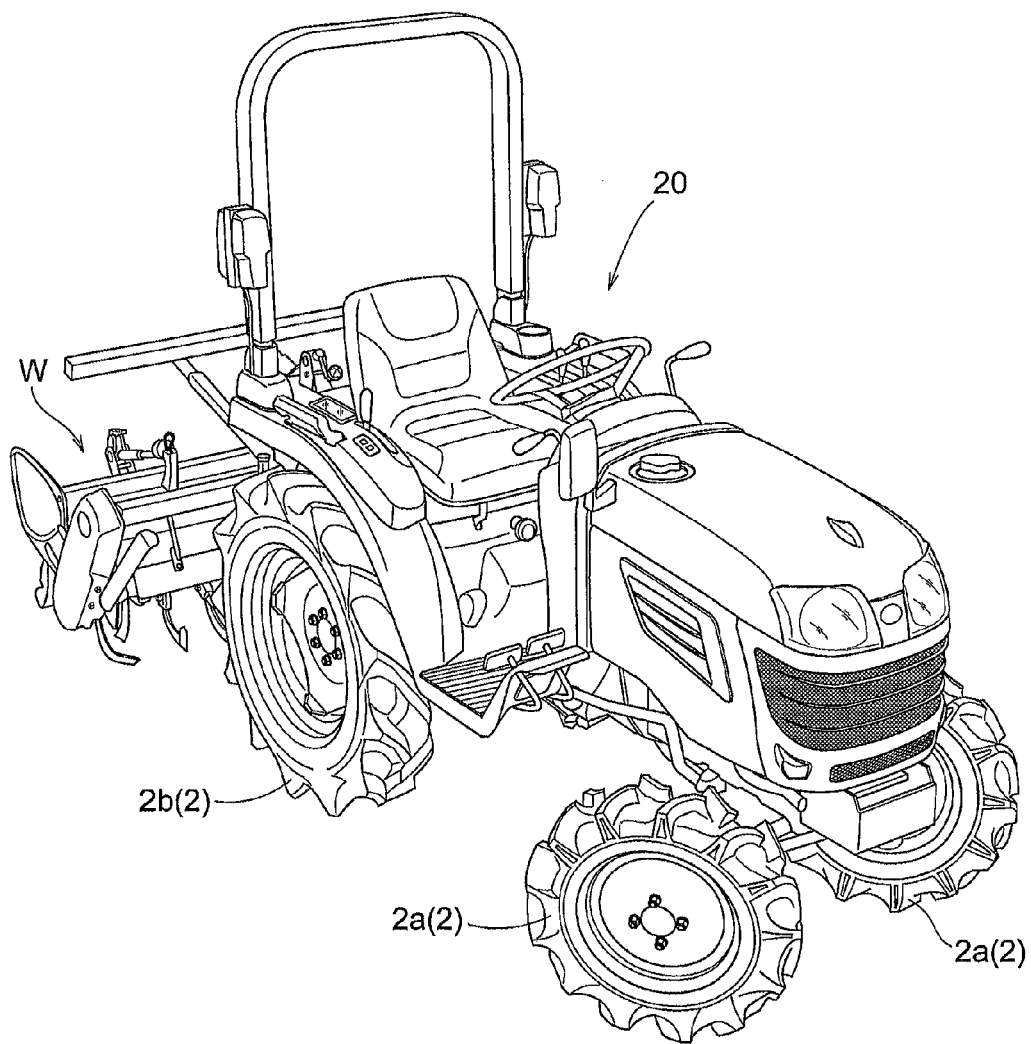
FIG. 8 is a perspective view of a general tractor, which is the second embodiment of the hybrid work vehicle according to the present invention.
Figure 9:
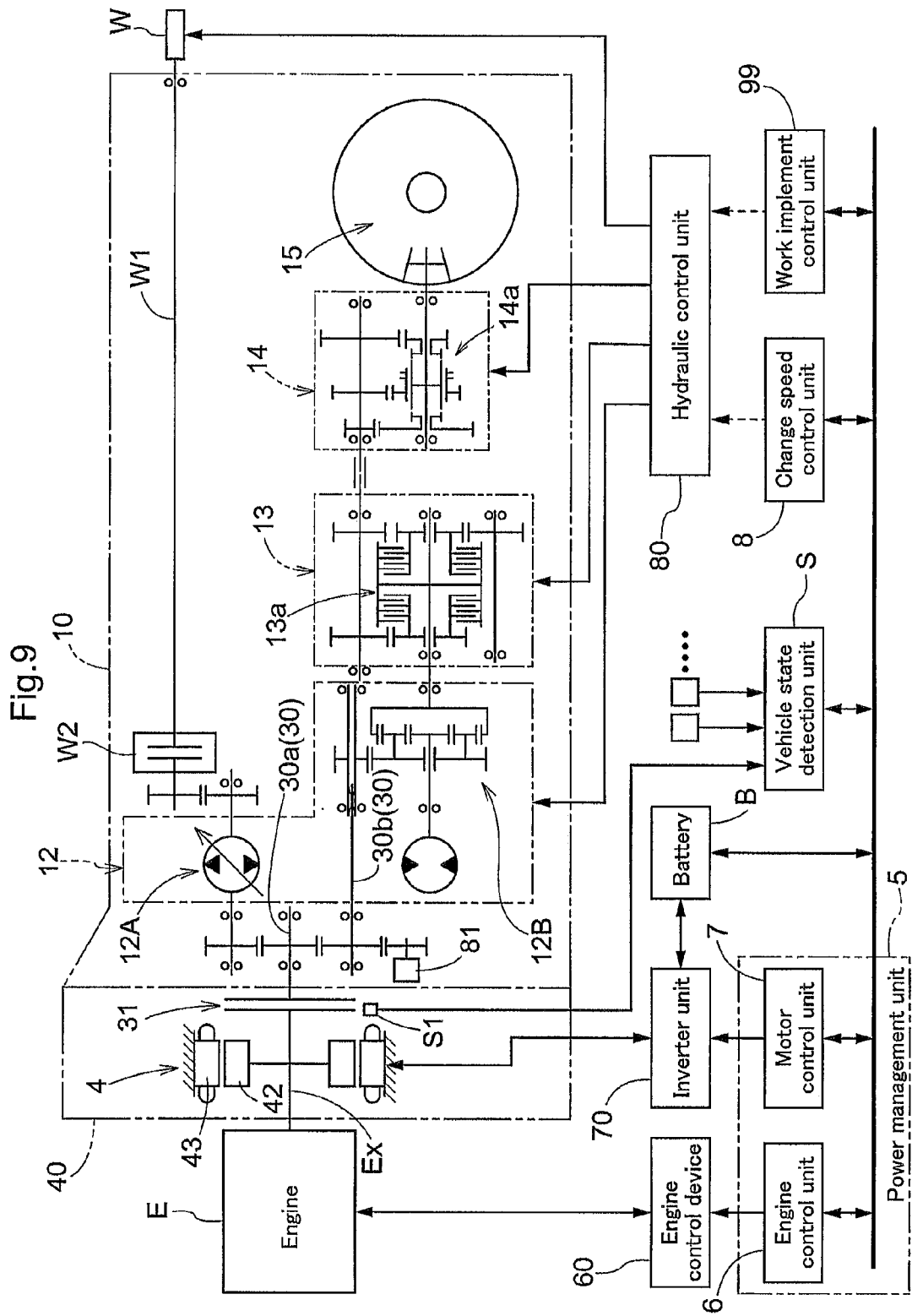
FIG. 9 is a schematic diagram showing a power system of a tractor.

Next, the second embodiment will be described using a specific example. Here, the hybrid work vehicle is a general tractor in a well-known form as shown in FIG. 8. The power system of the tractor is schematically shown in FIG. 9. The vehicle body of the tractor is equipped with an internal combustion engine E, a motor generator 4, a hydraulically-driven main clutch 31, a transmission 10, a driving section 20, a pair of right and left front wheels 2*a* and a pair of right and left rear wheels 2*b* that serve as a running device 2, and the like. Furthermore, the rear part of the vehicle body is equipped with a cultivation machine serving as a work implement W, via an elevation mechanism (not shown). The elevation mechanism is operated by a hydraulic cylinder. Note that since this general tractor is similar to the tractor described in the first embodiment, the prior description should be referred to for the details not described here.

As schematically shown in FIG. 9, the internal combustion engine E in this tractor is a diesel engine (hereinafter abbreviated as an "engine E") whose revolution is controlled using a common-rail system, and is provided with a common-rail control device as the engine control device 60. The transmission 10 includes a hydraulic-mechanical continuously variable transmission (hereinafter abbreviated as the "HMT") 12, a forward/backward travel switching device 13, a gear shifting device 14 for shifting between multiple gears, and a differential mechanism 15, and the power of the transmission 10 eventually rotates drive wheels (the front wheels 2*a* and/or the rear wheels 2*b*) 2 through the transmission shaft 30. The forward/backward travel switching device 13 and the gear shifting device 14 are provided with hydraulically-driven transmission clutches 13*a* and 14*a*, respectively. Furthermore, the cultivation machine 9 mounted in the tractor through the PTO shaft W1, which constitutes a part of the transmission shaft 30 for transmitting rotational power of the engine E and the motor generator 4, can receive the rotational power, and a cultivation rotor is thereby driven to rotate at a predetermined cultivation depth.

With the above-described configuration, the HMT 12 can continuously shift the speed of power transmission to the front wheels 2*a* and/or the rear wheels 2*b*, which are drive wheels, by changing the angle of the swash plate in the hydrostatic transmission mechanism 12A. This swash plate control is realized by hydraulic control by a hydraulic control unit 80 that operates based on a control command from a change speed control unit 8. Also, a hydraulic pump 81 is provided as a hydraulic source for the hydraulic actuators such as the above-described hydraulically-driven cylinder, main clutch 31, and transmission clutches 13*a* and 14*a*. The hydraulic pump 81 may be a mechanical pump that receives rotational power from the transmission shaft 30, or may be an electric pump that receives rotational power from an electric motor. In the case of an electric pump, this electric motor is controlled by the hydraulic control unit 80.

To the control of the motor generator 4 in this power system, that is, to the torque assistance for the engine E, the description thereof in the first embodiment applies.

The parameter that can be easily used in the calculation of the load amount by the load amount calculation unit (load information generation unit) 51 in the power management unit 5 is a variation in the number of rotations (rotational speed) of the transmission shaft 30. In the present embodiment, a rotational speed sensor S1 for detecting the number of rotations of the number of rotations of the transmission shaft 30 is inserted into a hole that penetrates a wall face of the motor housing 40, and its sensing portion at an lower end is located near the outer circumferential face of the base plate 31*a* of the main clutch 31. In other words, the rotational speed sensor S1 is configured as a pickup sensor that counts rotations of the base plate 31*a* based on a change in magnetic flux density. Of course an optical sensor may be employed as the rotational speed sensor S1, and a configuration in which the number of rotations of the transmission shaft 30 is detected may be employed.

In the tractor having the above-described configuration, it is basically important for better fuel efficiency that the engine control unit 6 included in the power management unit 5 causes the engine E to operate in a fuel-efficient low-speed zone. If the load working on the engine E is deemed to exceed a threshold value, electricity from the battery B is supplied as the three-phase alternating-current power to the motor generator 4 via the inverter unit 70 that is driven based on a control signal from the motor control unit 7, and the engine E is assisted using driving force of the motor generator 4. In particular, if a reduction in the number of engine revolutions is detected due to an increase in a sudden increase in the engine load during a constant-speed work, the torque assistance process using the motor generator 4 is executed so as to at least partially cancel the increase in the engine load, thereby avoiding an unexpected decrease in the number of engine revolutions and engine stall. If the load working on the engine E is deemed to be smaller than a threshold value, based on engine information acquired by the engine control unit 6 itself or vehicle state information sent from the vehicle state detection unit, control is executed under which electricity generated by the motor generator 4 is supplied to the battery B via the inverter unit 70 to charge the battery B.

However, since the capacity of the battery B mounted in the tractor is limited, and the torque assistance during running for working requires considerable power consumption, the battery B will go flat if torque assistance is easily allowed during a work. To prevent the battery B from going flat, the assistance by the motor generator 4 must be executed, taking account of the charging amount of the battery B.

Figure 10:
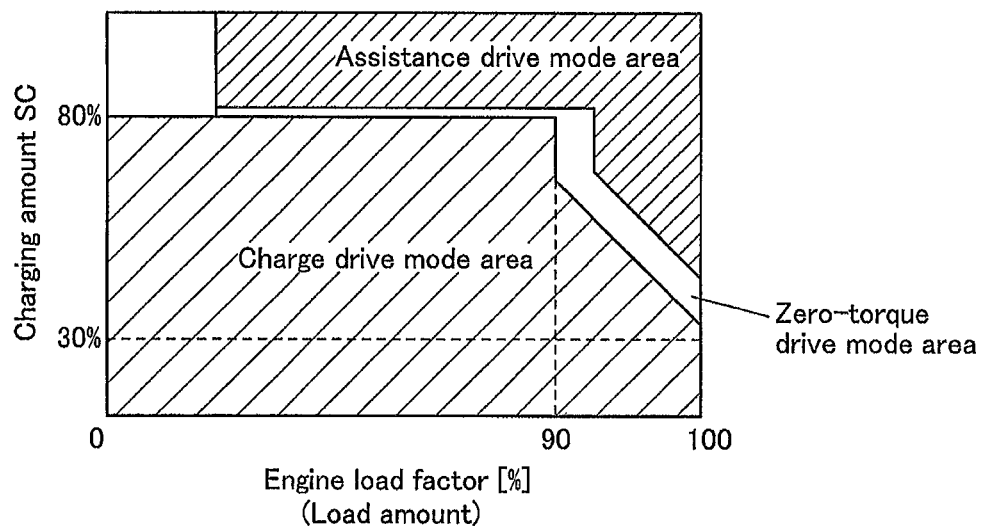
FIG. 10 is a schematic diagram showing selection of a drive mode based on a charging amount and an engine load factor (load amount).

In the second embodiment, the load amount calculation unit (load information generation unit) 51 calculates an engine load factor as the load amount of the engine E, based on information regarding an engine load acquired from the vehicle state detection unit S or the engine control unit 6. Furthermore, the driving mode setting unit 53 selects one drive mode from the assistance drive mode, the charge drive mode, and the zero-torque drive mode, based on the charging amount SC of the battery B calculated by the charging amount calculation unit 54 and the engine load factor calculated by the load amount calculation unit 51. In this selection process, the driving mode setting unit 53 uses a determination map shown in FIG. 10. From the determination map, it is understood that the torque assistance is not performed in principle unless the charging amount SC is sufficient. For example, the charging amount of about 80% is considered to be an assistance determination line, and the torque assistance is not performed if the charging amount is smaller than or equal to this line so as to prevent the battery B from going flat. However, when the engine load factor is close to 100%, the possibility of engine stall arises, and therefore, the torque assistance is performed even if the charging amount is smaller than or equal to 80%. At this time, the assistance determination line is inclined in the zone of the engine load factor from 90% to 100% such that, when the engine load factor is a predetermined value (here, about 90% or larger), the torque assistance is configured to be performed as the engine load factor is higher, even if the charging amount is small. When the engine load factor is 100%, the torque assistance will be performed even if the charging amount is about 30%. The assistance determination line is in a band shape in this determination map, the area above the upper boundary of the assistance determination line is an assistance drive mode area, and the area below the lower boundary of the assistance determination line is a charge drive mode area. Furthermore, an assistance determination band surrounded by the upper boundary and the lower boundary of the assistance determination line is a buffer area in which neither the torque assistance nor charging is performed, and in the present embodiment, this buffer area is a zero-torque drive mode area in which the zero-torque drive control is performed.

Also, in the present embodiment, the driving mode setting unit 53 is provided with exception processing for forcibly selecting the charge drive mode when the following information is input.

(*1) Information indicating a situation where the main clutch 31 or the transmission clutches 13a and 14a are turned off, and transmission torque of the transmission shaft 30 runs out.

(*2) Information indicating that the main clutch 31 or the transmission clutches 13a and 14a are in a half-clutch state, and a possibility that the main clutch 31 or the transmission clutches 13a and 14a are burnt is arising.

(*3) Information indicating that the work vehicle has stopped and the work implement W is not performing a substantial work.

Thus, if a situation that does not require the torque assistance exceptionally occurs, or if such a situation is expected to occur, the assistance drive mode is switched to the charge drive mode to increase the chance of charging.

Although the above-described second embodiment uses the number of engine revolutions or the number of rotations of the transmission shaft to detect the load working on the engine E, a load detection sensor may be provided directly in the work implement W, and the drive mode may be selected using its load detection signal. Furthermore, as the map used by the assistance calculation unit 52 to calculate the assistance amount from an input parameter, dedicated maps optimized respectively for types of the work implement W and forms of use thereof may be created in advance, and one of these maps may be appropriately selected.

Third Embodiment

Figure 11:
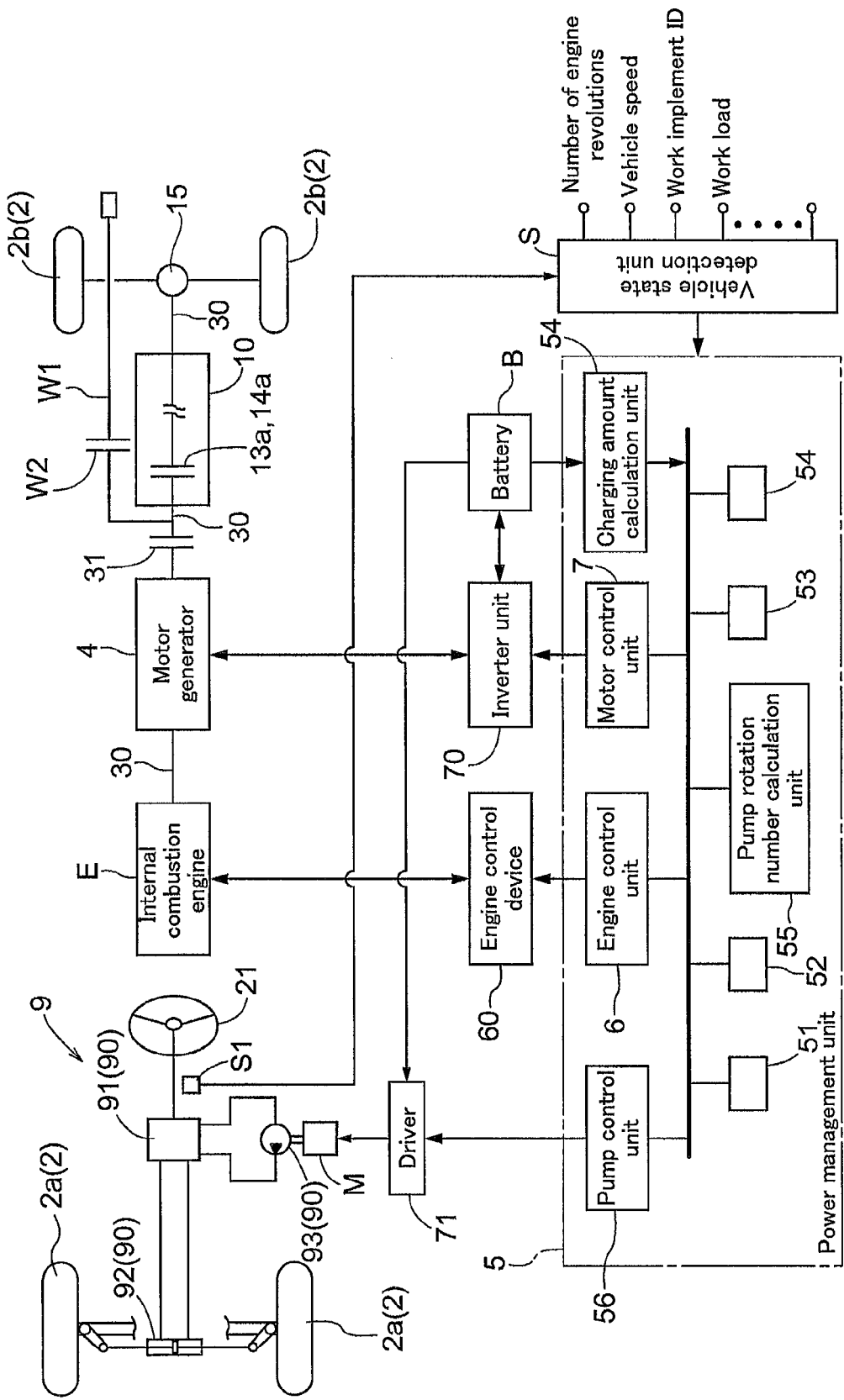
FIG. 11 is a schematic diagram illustrating basic principles of a hydraulic vehicle operation device in a third embodiment of a hybrid work vehicle according to the present invention.

Prior to a detailed description of a third embodiment of the present invention, a basic configuration of a hydraulic vehicle operation device employed in the third embodiment will be described using FIG. 11. Note that the basic configuration of this hydraulic vehicle operation device includes the basic configuration of the power system shown in FIG. 1 or FIG. 6, and the above description should be referred to for the details not described here. Note that the vehicle shown as an example in FIG. 11 is a hybrid work vehicle, and a power-steering device 9 is dealt with as the hydraulic vehicle operation device.

The power-steering device 9 is provided with a steering wheel 21 disposed above a handle post 22, and a power-steering hydraulic circuit 90 for changing a steering angle of a steering control wheel 2a based on an input, which is a steering operation of the steering wheel 21. The power-steering hydraulic circuit 90 includes a power-steering hydraulic control unit 91 functioning as a power-steering control valve that receives an operation input, which is a rotational displacement of the steering wheel 21, a power-steering hydraulic cylinder 92 serving as a hydraulic actuator for changing the steering angle of the steering control wheel 2a, and an power-steering electric-hydraulic pump 93 serving as a hydraulic supply source, and these constituent components are connected via a hydraulic line. The power-steering electric-hydraulic pump (hereinafter referred to simply as an "electric-hydraulic pump") 93 is constituted by a pump unit and a motor unit for giving rotational power to the pump unit. Driving electricity is supplied to this electric-hydraulic pump 93, or more accurately to the motor unit thereof, by a driver 71, and the number of rotations (number of rotations per hour; rotational speed) of the motor unit, that is, the electric-hydraulic pump 93 changes depending on the amount of supplied electricity.

The power management unit 5, which is constructed substantially as a computer system, of this vehicle includes a pump rotation number calculation unit 55 and a hydraulic pump control unit 56, which serve as functional units related to the power-steering device 9. A vehicle state detection unit S for receiving an input of signals of various sensors and switches is connected to the power management unit 5, and the power management unit 5 can also receive steering angle information regarding the steering angle from a steering angle sensor S1 serving as an operation amount detection unit for detecting a rotation angle as an amount of operation of the steering wheel 21, that is, a steering angle of the steering control wheel 2a, via the vehicle state detection unit S.

The pump rotation number calculation unit 55 calculates the number of pump rotations of the electric-hydraulic pump 93, which is necessary for supplying hydraulic pressure to the power-steering hydraulic cylinder 92, using the steering angle information as an input parameter. The hydraulic pump control unit 56 outputs a control signal to the driver 71 such that the electric-hydraulic pump 93 is driven at the number of pump rotations calculated by the pump rotation number calculation unit 55. As a result of the driver 71 supplying the necessary amount of electricity from the battery B to the electric-hydraulic pump 93 based on the control signal, the electric-hydraulic pump 93 is thereby driven at a desired number of rotations, and a proper amount of hydraulic pressure is supplied to the power-steering hydraulic circuit 90.

Note that this hybrid work vehicle is provided with an internal combustion engine E and a motor generator 4 as driving sources, and uses at least rear wheels 2b as drive wheels to run. The motor generator 4, to which power is supplied from a battery B, generates rotational power and cooperates with the internal combustion engine E to cause the hybrid work vehicle to run, and this motor generator 4 can also function as a generator for supplying electricity to the battery B in a situation where the hybrid work vehicle is driven by the internal combustion engine E, where the hybrid work vehicle is decelerating, or where the hybrid vehicle is running down a slope by inertia.

Revolution of the internal combustion engine E is controlled by an engine control unit 6 via an engine control device 60 such as an electronic governor mechanism or a common-rail mechanism. Driving of the motor generator 4 is controlled by a motor control unit 7 via an inverter unit 70. The engine control unit 6 is a computer unit for controlling a fuel injection amount or the like of the internal combustion engine E, and has a constant-speed control function of controlling the engine control device 60 so as to maintain a constant number of revolutions of the internal combustion engine E. The motor control unit 7 similarly is a computer unit, and gives a control signal to the inverter unit 70 to control the number of rotations and torque of the motor generator 4. Also, the motor control unit 7 is provided with an assistance drive mode for outputting power to the transmission shaft 30 and a charge drive mode for outputting charging electricity to the battery B as drive modes for the motor generator 4. As is known well, the inverter unit 70 converts direct voltage of the battery B into alternating voltage and supplies it to the motor generator 4, and also functions as a rectifier and a voltage adjustment device for supplying direct voltage to the battery B when the motor generator 4 works as a generator. In other words, the battery B operates in a discharge process of supplying electricity to the motor generator 4 via the inverter unit 70, and also operates in a charge process of being charged with electricity generated by the motor generator 4 when the motor generator 4 operates as a generator.

Figure 12:
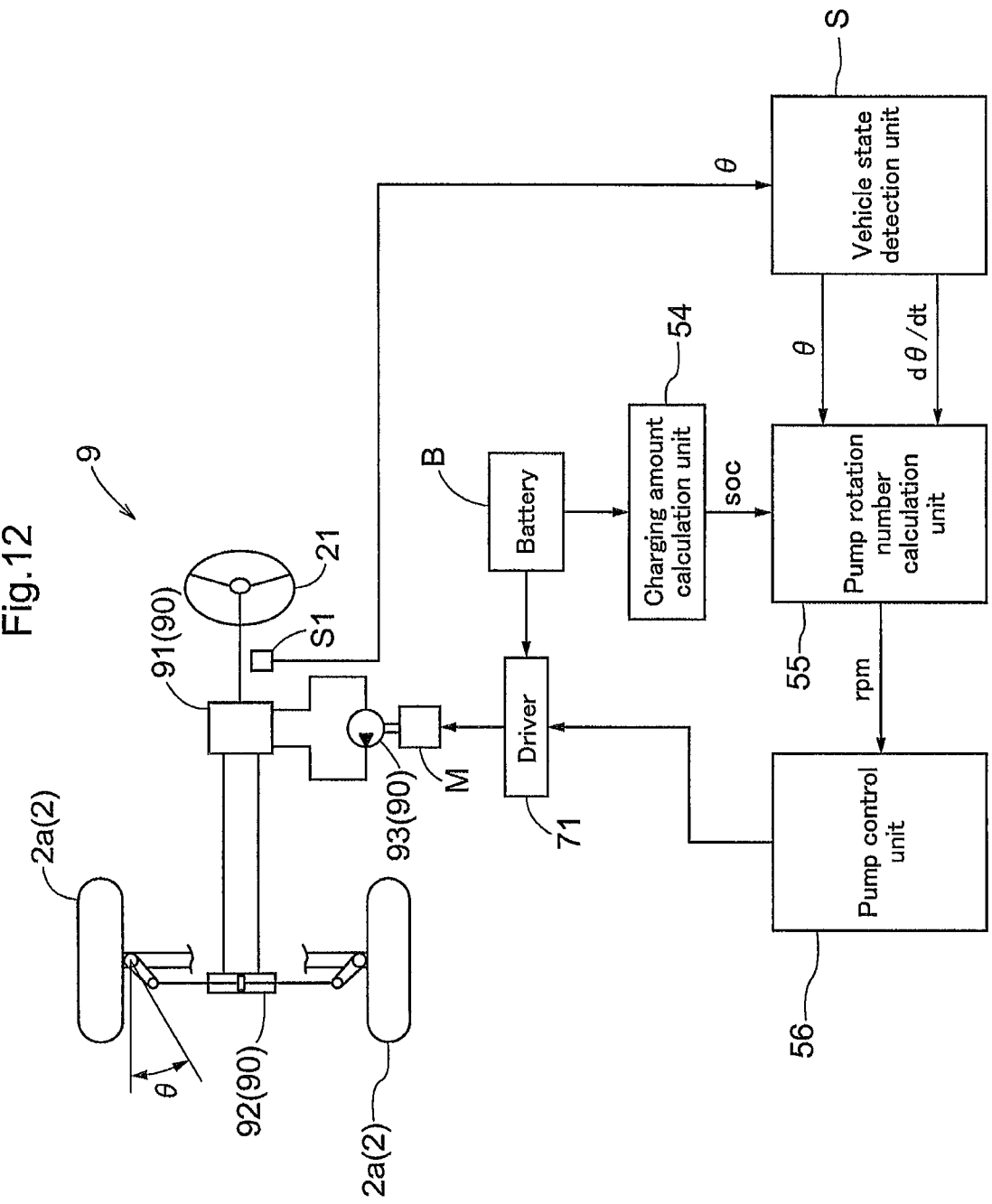
FIG. 12 is a schematic diagram showing a specific control structure and a control flow in a power-steering device in FIG. 11.

Next, a specific control configuration of the power-steering device 9 that operates on the above-described basic principle and its control flow will be described using FIG. 12.

When the steering wheel 21 is operated by a driver, the steering angle (denoted as "θ" in FIG. 12), which is the amount of operation of the steering wheel 21, is detected by the steering angle sensor S1. A steering angle detection signal, which indicates the detected steering angle, is sent to the vehicle state detection unit S and undergoes necessary preprocessing. Here, the vehicle state detection unit S generates the steering angle and the steering angular velocity (denoted as "dθ/dt" in FIG. 12) based on the steering angle detection signals that are sent over time, and the generated steering angle and steering angular velocity are sent to the pump rotation number calculation unit 55. The pump rotation number calculation unit 55 calculates the number of pump rotations to be the target in the control of the electric-hydraulic pump 93 that constitutes the power-steering hydraulic circuit 3, using the steering angle and the steering angular velocity. At this time, the number of pump rotations per minute: rpm is calculated by weighted calculation using the steering angle: θ and the steering angular velocity: dθ/dt as parameters (variables), and an exemplary expression of the weighted calculation is as below.

$$\text{rpm}=1200+\theta \times \alpha + d\theta/dt \times \beta$$

Here, α is a weighting coefficient of the steering angle, and β is a weighting coefficient of the steering angular velocity.

The constant term "1200" is a basic number of rotations, and is, for example, the number of pump rotations when the steering wheel 21 is positioned in a neutral area. By driving the electric-hydraulic pump at this basic number of rotations, the minimum necessary amount of hydraulic pressure is reserved in the associated power-steering hydraulic circuit 90. For example, in the case of a gear pump, supply of hydraulic pressure required for lubrication of the gear is realized.

As is understood from the above expression for weighted calculation, the necessary hydraulic pressure (flow rate) is estimated from two variables, namely the steering angle and the steering angular velocity of the steering wheel 21, and the required number of pump rotations is calculated. A more accurate number of pump rotations can be obtained by using functions of the steering angle and the steering angular velocity as the weighting coefficients of the steering angle and the steering angular velocity, respectively.

Figure 13:
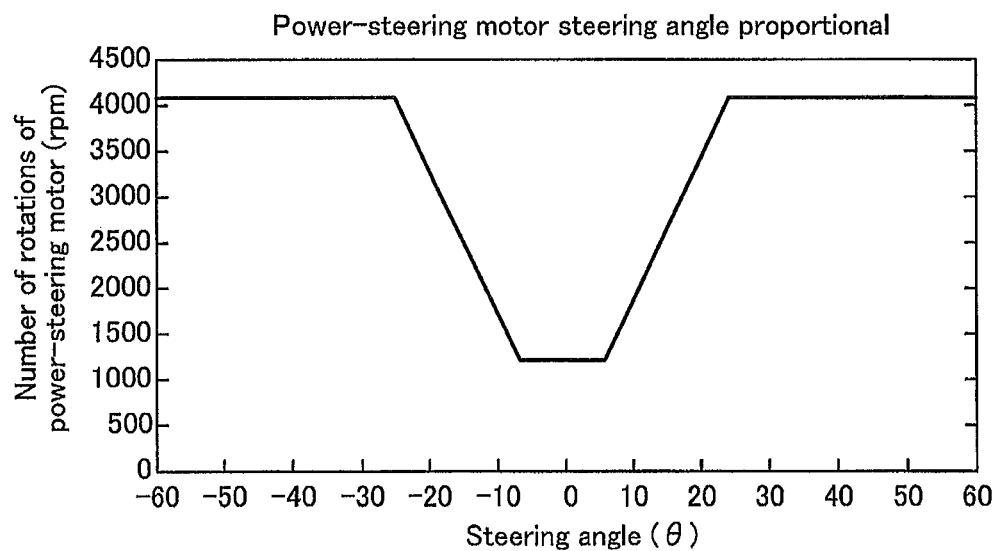
FIG. 13 is a graph showing a relationship between a steering angle and a necessary number of pump rotations estimated from the steering angle.
Figure 14:
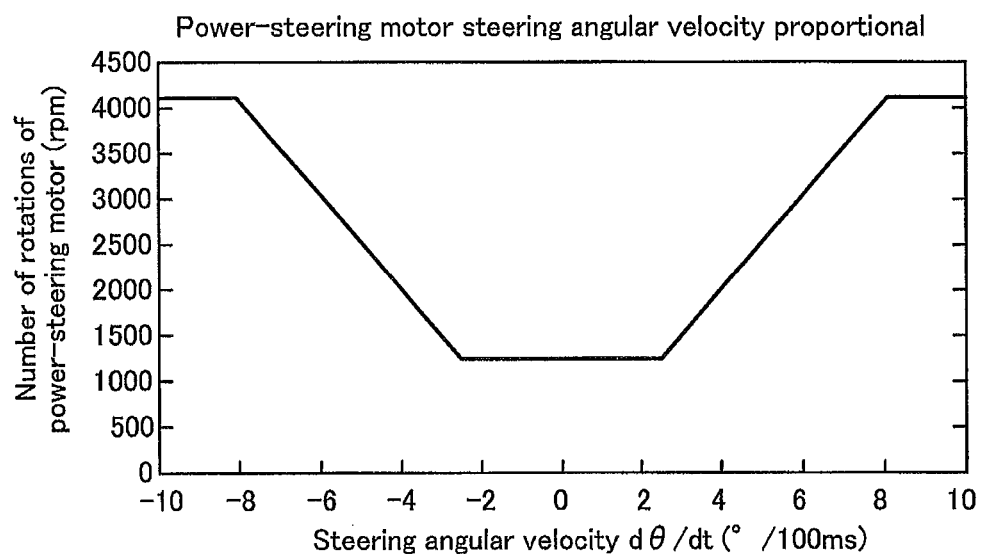
FIG. 14 is a graph showing a relationship between a steering angular velocity and a necessary number of pump rotations estimated from the steering angular velocity.

An exemplary relationship between the steering angle and the necessary number of pump rotations estimated from the steering angle is shown in FIG. 13. Also, an exemplary relationship between the steering angular velocity and the necessary number of pump rotations estimated from the steering angular velocity is shown in FIG. 14. It is convenient to create, based on these relationships, a table from which the number of pump rotations is read out based on the steering angle and the steering angular velocity and set the table in the pump rotation number calculation unit 55.

The number of pump rotations that is finally calculated by the weighted calculation is sent to the pump control unit 56. The pump control unit 56 sends a control signal to a motor of the electric-hydraulic pump 93 via the driver 71 so as to drive the electric-hydraulic pump 93 with a target number of rotations being the received number of pump rotations. Thus, the hydraulic pressure appropriate for the amount of operation of the steering wheel 21 is supplied to the power-steering hydraulic circuit 90 in the power-steering device 9.

It is also advantageous to use the charging amount (SOC) of the battery B calculated by the charging amount calculation unit 54, as an additional parameter for calculation of the number of pump rotations by the pump rotation number calculation unit 55. In other words, when the charging amount is small, the charging amount is used as a parameter for reducing at least one of the target number of pump rotations and the basic number of rotations, thereby realizing proper use of the electric-hydraulic pump 93, while taking account of prevention of the battery B from going flat.

Next, the third embodiment will be described using a specific example. Here, a general hybrid tractor, such as ones shown in FIGS. 3 and 8, is described, and a description of the transmission structure of the tractor schematically shown in FIG. 15 will be omitted.

Figure 15:
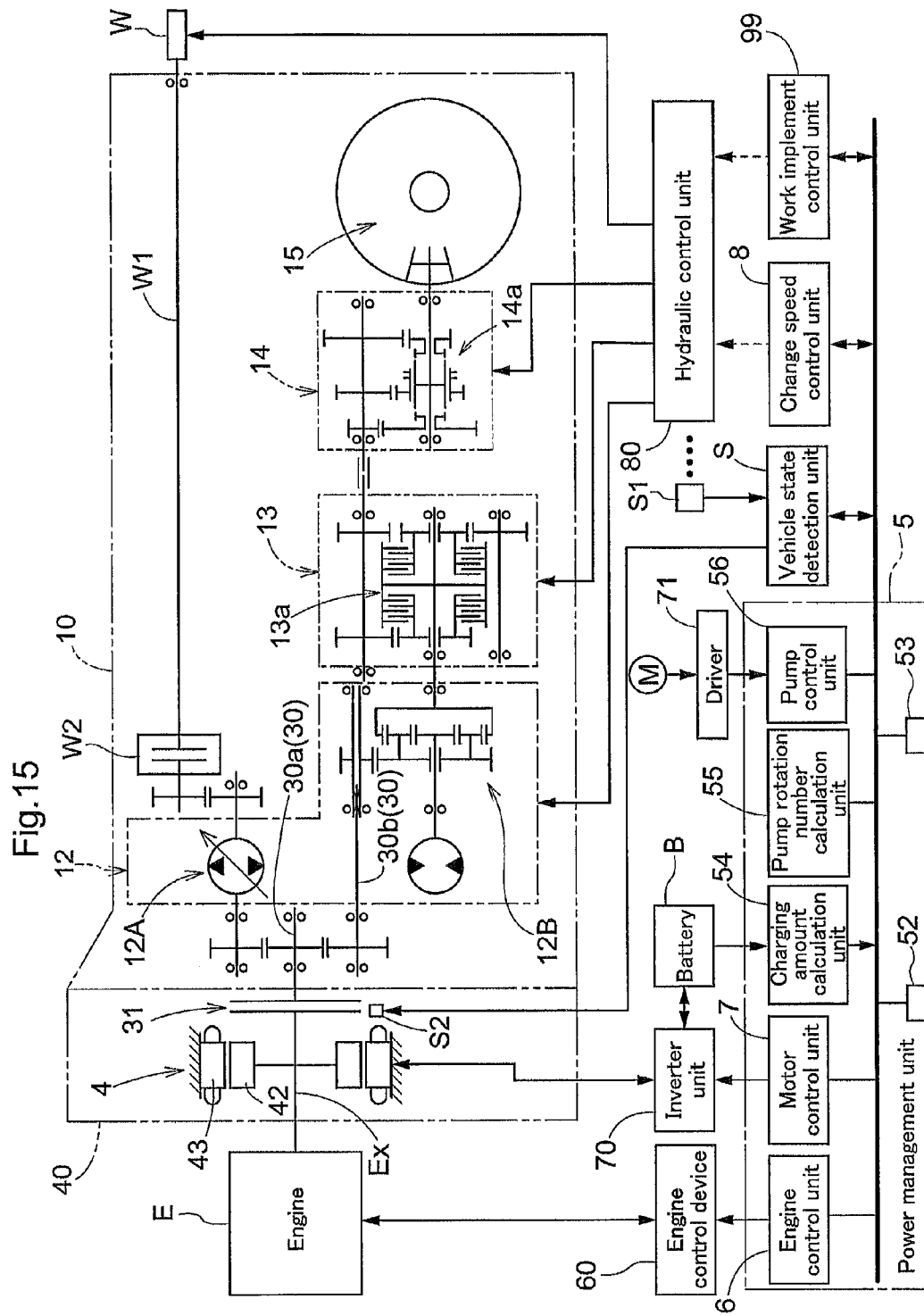
FIG. 15 is a schematic diagram showing a power system of a tractor of the third embodiment.

Control of the motor generator 4, that is, the torque assistance for the engine E is performed by the motor control unit 7 constructed in the power management unit 5. As shown in FIG. 15, control functional units for the power-steering device 9, namely a charging amount calculation unit 54, a pump rotation number calculation unit 55, and a pump control unit 56 are also constructed in the power management unit 5. The power management unit 5 is connected to the aforementioned vehicle state detection unit S, a change speed control unit 8 for a gear shifting operation in the transmission 10, a work implement control unit 99 for operating the cultivation machine W, and the like so as to be able to transmit data via an in-vehicle LAN. The change speed control unit 8 and the work implement control unit 99 control hydraulic devices via a hydraulic control unit 80. For this reason, the pump rotation number calculation unit 55 and the pump control unit 56 that serve as the control functional units for the power-steering device 9 may also be constructed within the change speed control unit 8 or the work implement control unit 99, or may be constructed in a unit that is independent therefrom. Control for driving the engine E and the motor generator 4 is similar to that in the above-described embodiments.

Figure 16:
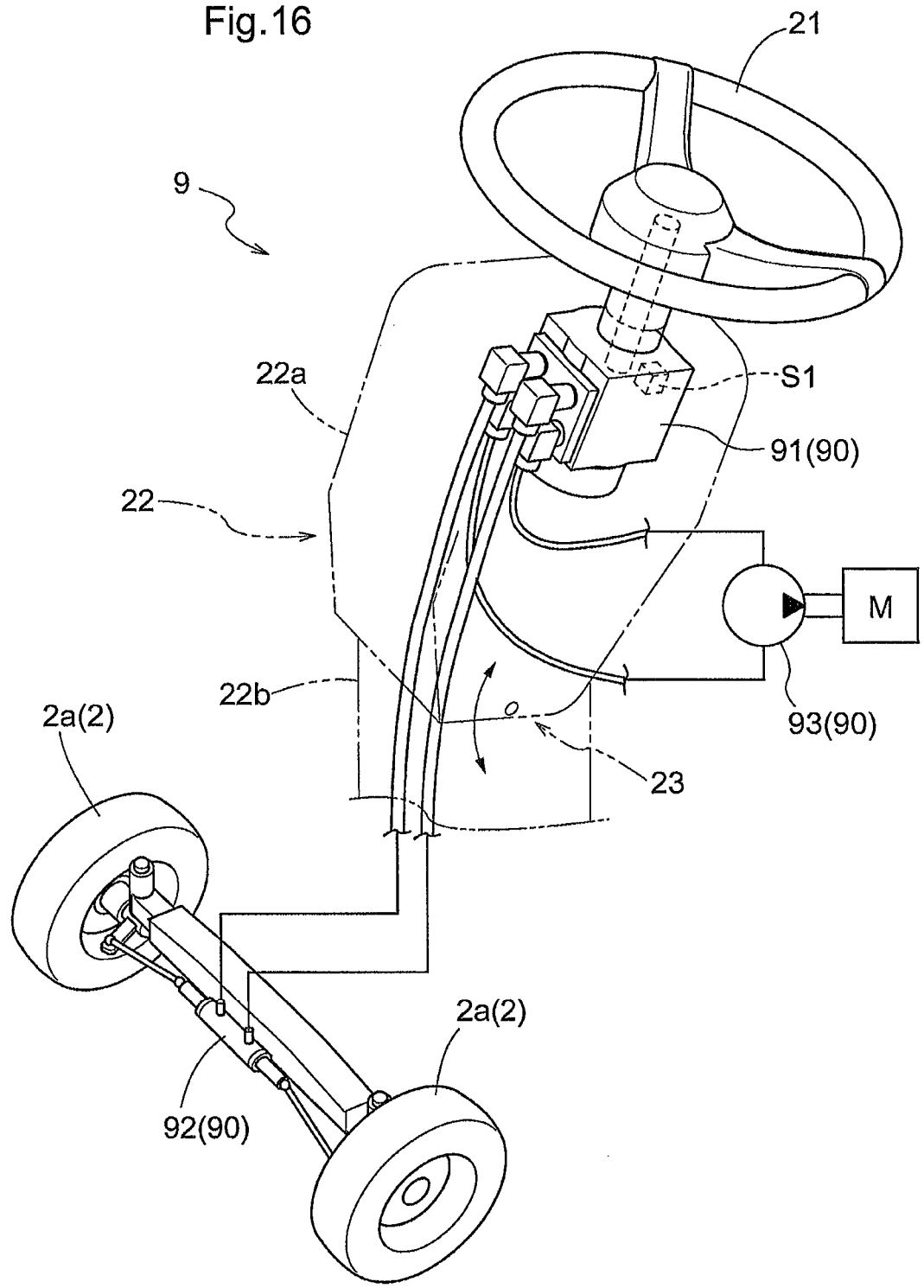
FIG. 16 is a perspective view showing an overview of a power-steering device of a tractor.

As schematically shown in FIG. 16, the power-steering device 9 in the tractor is substantially the same as that described using FIG. 1. A handle post 22 is constituted by a fixed post unit 22b attached to the vehicle body that extends in a vehicle transverse direction, and a swing post unit 22a coupled to the fixed post unit 22b via a tilt mechanism 23 so as to be swingable around a swing axis. The fixed post unit 22b and the swing post unit 22a are panel structures, the fixed post unit 22b is a cylinder having a square cross-section formed with side plates, and the swing post unit 22a is a cylinder whose upper portion formed with side plates and a top plate is covered. The basic principle that was described using FIGS. 11 and 12 applies as is to the configuration and the control of this power-steering hydraulic circuit 90. The power-steering hydraulic cylinder 92 is incorporated in a steering mechanism of the front wheels 2a, which are steering control wheels of the work vehicle.

Figure 17:
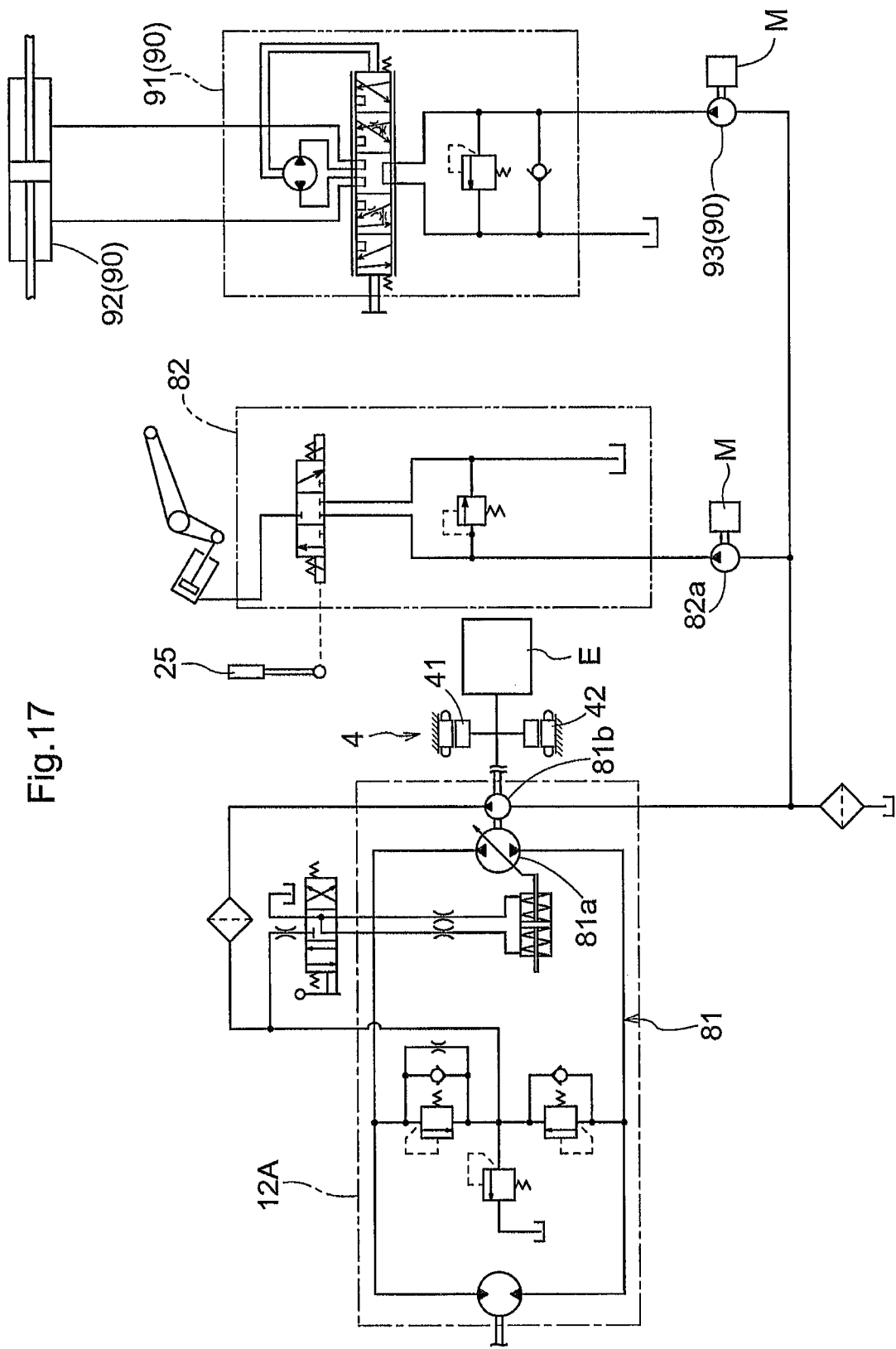
FIG. 17 is a hydraulic circuit diagram showing an overview of a hydraulic system in a tractor.

FIG. 17 is a hydraulic circuit diagram of the hydraulic circuit system of the tractor, and shows a hydraulic circuit 81 of a hydrostatic transmission mechanism 12A that constitutes an HMT 12, a hydraulic circuit 82 of an elevation mechanism for moving up/down the work implement W, and the aforementioned power-steering hydraulic circuit 90, while omitting hydraulic circuits of a main clutch 31 and a transmission clutch 10a. The hydraulic circuit 81 of the hydrostatic transmission mechanism 12A is provided, as hydraulic sources, with a hydraulic pump 81a of a swash plate control type that is driven with power of the engine E and the motor generator 4, and a charger pump 82b. The rotational speed of regular rotation and reverse rotation of the hydraulic motor that is rotated by hydraulic fluid supplied from the hydraulic pump 81a is changed through adjustment of a swash plate angle in the hydraulic pump by a swash plate adjustment mechanism including a swash plate control valve. The hydraulic circuit 82 of the elevation mechanism is provided with, as a hydraulic source, an electric-hydraulic pump 82a for elevation that is driven by an electric motor M, and is provided with an elevation lever 25 as an operation tool. In the hydraulic circuit 82 of the elevation mechanism as well, control for calculating the amount of rotation of the electric-hydraulic pump 82a for elevation may be performed such that only the necessary amount of hydraulic pressure is supplied based on the amount of operation of the elevation lever 25.

Note that in the hydraulic circuits included in the hydraulic circuit system, the hydraulic fluid supplied by the hydraulic pumps 81a, 82a, and 93 is used also as lubricating oil for the gears and the like, and therefore, even when the amount of operation of the respective operation tools is zero or close to zero, the hydraulic pumps are rotated to an extent that a certain amount (an amount necessary for lubrication etc.) of hydraulic pressure is reserved within the hydraulic circuit, thereby avoiding inconvenience caused by complete stop.

In the above-described third embodiment, a vehicle running speed may be additionally employed as an input parameter used in derivation of the number of pump rotations based on the steering angle by the pump rotation number calculation unit 55. More specifically, in a case where a map (table) is used with which the steering angle and the steering angular velocity are used as input parameters to derive the number of pump rotations, a configuration can be employed in which the map is changed in accordance with the vehicle running speed or the used gear position.

Also, the electric pump control in the hydraulic operation device in the above-described third embodiment is applicable not only to a tractor (work vehicle) of a hybrid drive type, but also to a tractor (work vehicle) driven only by an engine. In other words, the invention relating to a hydraulic operation device according to the third embodiment is applicable to a normal (non-hybrid) engine-driven vehicle using an electric motor for driving a hydraulic pump.

Next, modifications applicable to all of the above-described three embodiments are listed below.

(1) As the map used for calculating the assistance amount using an input parameter, dedicated maps optimized respectively for types of the work implement W and forms of use thereof may be created in advance, and one of these maps may be appropriately selected. For example, a work load characteristic setting unit for setting work load characteristics of work implements W mounted in the work vehicle is constructed in the power management unit 5, and the work load characteristics of the work implement W that is actually mounted and used are read out from the work load characteristic setting unit and are given as auxiliary parameters to the load information generation unit (load amount calculation unit) 51. Thus, the load information generation unit 51 can estimate, for example, the degree of a future variation in the load that accompanies a variation in the number of revolutions obtained from the vehicle state detection unit S, based on the work load characteristics, and can generate more accurate load information.

(2) Although the engine E and the motor generator 4 are directly connected and the clutch 31 is mounted thereafter such that power is transmitted to the transmission shaft 30 in the above embodiments, the clutch 31 may alternatively be mounted between the engine E and the motor generator 4.

(3) Although a continuously variable transmission using the HMT 12 is employed as the transmission 10 in the above embodiments, a multistage transmission using a multistage gear transmission device may alternatively be employed.

(4) Although the amounts of operation of the operation tools (the steering wheel 21, the elevation lever 25, etc.) are detected by the sensors in the above embodiments, indirect detection of the amounts of operation, such as detection of displacement of other members that are displaced by operation tools, for example, a spool in a control valve, may alternatively be employed.

INDUSTRIAL APPLICABILITY

The present invention is applicable not only to a tractor, but also to a farming vehicle such as a riding rice-planting machine, a lawnmower, or a combine, as well as to a construction vehicle such as a front loader or a backhoe.

REFERENCE SIGN LIST

2: running device
2a: front wheel (running device)
2b: rear wheel (running device)
20: driving section
21: steering wheel (operation tool)
4: motor generator
40: motor housing
30: transmission shaft
31: clutch
10: transmission
13a, 14a: transmission clutch
5: power management unit
51: load amount calculation unit
52: assistance calculation unit
53: drive mode setting unit
54: charging amount calculation unit
55: pump rotation number calculation unit 56: pump control unit (hydraulic pump control unit)
6: engine control unit
60: engine control device (common-rail)
7: motor control unit
70: inverter unit
81: hydraulic pump
9: power-steering device (hydraulic vehicle operation device)
90: power-steering hydraulic circuit
91: power-steering control unit
92: power-steering hydraulic cylinder (hydraulic actuator)
93: power-steering electric-hydraulic pump (electric-hydraulic pump)
S: vehicle state detection unit
B: battery
E: internal combustion engine
W: work implement
W1: PTO shaft
W2: PTO clutch

What is claimed is:

1. A hybrid work vehicle comprising:
an internal combustion engine for supplying driving force to a running device and a work implement via a transmission shaft;
a motor generator for assisting the internal combustion engine by outputting power to the transmission shaft;
a battery for receiving charging electricity from the motor generator and giving driving electricity to the motor generator;
a load information generation unit for generating load information indicating a rotational load received by the internal combustion engine when in a constant-speed control mode for maintaining a constant number of revolutions of the internal combustion engine, based on an input parameter; and
an assistance calculation unit for calculating an amount of assistance for the internal combustion engine by the motor generator when in the constant-speed control mode, based on the load information.

2. The hybrid work vehicle according to claim 1, wherein the internal combustion engine is driven using a common-rail system, and the load information generation unit generates the load information using common-rail control information as the input parameter.

3. The hybrid work vehicle according to claim 1, wherein the load information generation unit generates the load information using behavior of a number of revolutions of the internal combustion engine as the input parameter.

4. The hybrid work vehicle according to claim 1, further comprising:
a work load characteristic setting unit for setting a work load characteristic of the work implement,
wherein the work load characteristic is given as an auxiliary parameter to the load information generation unit.

5. The hybrid work vehicle according to claim 1, wherein the assistance calculation unit calculates the amount of assistance so as to supplement a flywheel characteristic that is appropriate for the internal combustion engine.

6. The hybrid work vehicle according to claim 1, wherein the load information is associated with time to provide a control map, and based on the control map, the load information generation unit generates the load information indicating the rotational load received by the internal combustion engine.

7. A hybrid work vehicle comprising:
an internal combustion engine for supplying driving force to a running device and a work implement via a transmission shaft;
a motor generator for assisting the internal combustion engine by outputting power to the transmission shaft;
a battery for receiving charging electricity from the motor generator and giving driving electricity to the motor generator;
a load amount calculation unit for calculating a load amount indicating a rotational load received by the internal combustion engine, based on an input parameter;
a charging amount calculation unit for calculating a charging amount of the battery;
a drive mode selection unit for selecting one drive mode from an assistance drive mode for outputting power to the transmission shaft and a charge drive mode for outputting charging electricity to the battery, based on the load amount and the charging amount; and
a motor control unit for controlling drive of the motor generator in a drive mode selected by the drive mode selection unit.

8. The hybrid work vehicle according to claim 7, wherein the assistance drive mode is selected when the load amount is larger than or equal to a predetermined amount, even in a state where the charging amount is smaller as the load amount is higher.

9. The hybrid work vehicle according to claim 7, wherein if power transmission by the transmission shaft is interrupted while the assistance drive mode is selected, the drive mode is forcibly switched from the assistance drive mode to the charge drive mode.

10. The hybrid work vehicle according to claim 7, wherein if a clutch that is transmitting power of the transmission shaft is in a half-clutch state while the assistance drive mode is selected, the assistance drive mode is forcibly interrupted.

11. The hybrid work vehicle according to claim 7, further comprising:
an assistance calculation unit for calculating an amount of assistance for the internal combustion engine by the motor generator when in the assistance drive mode, based on the load amount.

12. The hybrid work vehicle according to claim 7, wherein the internal combustion engine is driven using a common-rail system, and the load amount calculation unit generates the load amount using common-rail control information as the input parameter.

13. The hybrid work vehicle according to claim 7, further comprising a load information generation unit for generating load information indicating the rotational load received by the internal combustion engine when in a constant-speed control mode for maintaining a constant number of revolutions of the internal combustion engine, based on the input parameter, wherein the load information is associated with time to provide a control map, and based on the control map, the load information generation unit generates the load information indicating the rotational load received by the internal combustion engine.

14. A hybrid work vehicle comprising:
an internal combustion engine for supplying driving force to a running device and a work implement via a transmission shaft;
a motor generator for assisting the internal combustion engine by outputting power to the transmission shaft;

a hydraulic vehicle operation device in which a hydraulic actuator and an electric-hydraulic pump for supplying hydraulic pressure to the hydraulic actuator are incorporated;

a battery for receiving charging electricity from the motor generator, giving driving electricity to the motor generator, and supplying electricity to the electric-hydraulic pump;

an operation tool for giving an amount of operation with respect to the hydraulic vehicle operation device;

an operation amount detection unit for detecting the amount of operation;

a pump rotation number calculation unit for calculating a number of pump rotations of the electric-hydraulic pump that is necessary for supplying hydraulic pressure to the hydraulic actuator, using operation information regarding the amount of operation as an input parameter; and a hydraulic pump control unit for outputting a control signal to the electric-hydraulic pump such that the electric-hydraulic pump is driven at the number of pump rotations calculated by the pump rotation number calculation unit.

15. The hybrid work vehicle according to claim 14, further comprising:

a charging amount calculation unit for calculating a charging amount of the battery, wherein the charging amount is used as an additional input parameter for calculation of the number of pump rotations by the pump rotation number calculation unit.

16. The hybrid work vehicle according to claim 14, wherein the operation tool is a steering wheel, the hydraulic vehicle operation device is a power-steering device, and the operation information regarding the amount of operation is at least one of a steering angle and a steering angular velocity.

17. The hybrid work vehicle according to claim 14, wherein the battery is also used as a running-drive motor generator.

18. The hybrid work vehicle according to claim 14, wherein the hydraulic vehicle operation device comprises a power-steering device, and a lifting mechanism of the work implement that is removably attached to the hybrid work vehicle;

the operation tool comprises a steering wheel for operating the power-steering device, and an elevation lever for operating the work implement;

wherein the electric-hydraulic pump includes a first electric-hydraulic pump for driving the power-steering device, and a second electric-hydraulic pump for driving the lifting mechanism;

wherein there is provided a charge pump that is driven by the internal combustion engine and the motor generator for supplying hydraulic oil to a hydraulic oil circuit incorporating the first electric-hydraulic pump and the second electric-hydraulic pump; and there is provided a first electric motor for driving the first electric-hydraulic pump and a second electric motor for driving the second electric-hydraulic pump.

* * * * *